US010680864B2

(12) United States Patent
Zhang et al.

(10) Patent No.: US 10,680,864 B2
(45) Date of Patent: Jun. 9, 2020

(54) SYSTEM AND SCHEME OF SCALABLE OFDM NUMEROLOGY

(71) Applicants: Liqing Zhang, Ottawa (CA); Kelvin Kar Kin Au, Ottawa (CA); Jianglei Ma, Ottawa (CA); Wen Tong, Ottawa (CA); Toufiqul Islam, Ottawa (CA)

(72) Inventors: Liqing Zhang, Ottawa (CA); Kelvin Kar Kin Au, Ottawa (CA); Jianglei Ma, Ottawa (CA); Wen Tong, Ottawa (CA); Toufiqul Islam, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/234,129

(22) Filed: Dec. 27, 2018

(65) Prior Publication Data

US 2019/0132169 A1 May 2, 2019

Related U.S. Application Data

(63) Continuation of application No. 16/036,569, filed on Jul. 16, 2018, which is a continuation of application No. 15/169,553, filed on May 31, 2016, now Pat. No. 10,038,581.

(60) Provisional application No. 62/169,342, filed on Jun. 1, 2015, provisional application No. 62/320,252, filed on Apr. 8, 2016, provisional application No. 62/335,524, filed on May 12, 2016.

(51) Int. Cl.
H04L 27/26 (2006.01)
H04L 5/00 (2006.01)

(52) U.S. Cl.
CPC ........ *H04L 27/2602* (2013.01); *H04L 5/0007* (2013.01); *H04L 27/2646* (2013.01)

(58) Field of Classification Search
CPC ............... H04L 27/2602; H04L 5/0007; H04L 27/2646
USPC .......................................................... 375/260
See application file for complete search history.

(56) References Cited

U.S. PATENT DOCUMENTS

| 10,038,581 | B2 | 7/2018 | Zhang et al. |
| 2007/0058595 | A1 | 3/2007 | Classon et al. |
| 2007/0268812 | A1* | 11/2007 | Yoon ..................... H04L 1/0006 370/203 |
| 2008/0043866 | A1* | 2/2008 | Mujtaba .............. H04L 27/2628 375/260 |
| 2010/0149961 | A1 | 6/2010 | Lee et al. |

(Continued)

FOREIGN PATENT DOCUMENTS

| CN | 101282160 A | 10/2008 |
| CN | 101904125 A | 12/2010 |

(Continued)

OTHER PUBLICATIONS

3GPP A Global Initiative; Eiko Seidel; Nomor 3GPP Newsletter, Overview LTE PHY: Part 1—Principles and numerology etc., Jun. 2007.

(Continued)

*Primary Examiner* — Michael R Neff

(57) ABSTRACT

For a wireless communications system, scalable orthogonal frequency division multiplexing (OFDM) numerology is incorporated in a manner that can apply to radio link transmissions in future wireless network for frequency division duplex (FDD) and time division duplex (TDD) communications.

40 Claims, 13 Drawing Sheets

(56) References Cited

U.S. PATENT DOCUMENTS

| | | | |
|---|---|---|---|
| 2011/0096783 A1 | 4/2011 | Cai et al. | |
| 2013/0121301 A1 | 5/2013 | Kim et al. | |
| 2013/0195002 A1* | 8/2013 | Walker .................... | H04W 4/00 370/312 |

FOREIGN PATENT DOCUMENTS

| | | |
|---|---|---|
| CN | 103595678 A | 2/2014 |
| CN | 104094549 A | 10/2014 |
| EP | 2456116 A2 | 5/2012 |
| JP | 2008028818 A | 2/2008 |
| JP | 2008535391 A | 8/2008 |
| JP | 2011502386 A | 1/2011 |
| JP | 2015510338 A | 4/2015 |
| RU | 2013108263 A | 9/2014 |
| WO | 2008097038 A2 | 8/2008 |
| WO | 2008118429 A1 | 10/2008 |
| WO | 2009052420 A2 | 4/2009 |

OTHER PUBLICATIONS

International Search Report, PCT/CN2016/084411, dated Aug. 24, 2016.
Eeva Lahetkangas et al.,"On the Flexible 5G Dense Deployment Air Interface for Mobile Broadband",2014 1st International Conference on 5G for Ubiquitous Connectivity (5GU), total 5 pages.
Dong Li et al., "Subframe Structure with Variable-length CP", IEEE C802.16m-08/201, IEEE,dated Mar. 7, 2008, total 7 pages.
XP051089943 R1-164692 Qualcomm Incorporated,"Numerology and TTI multiplexing for NR Forward Compatibility Analysis",3GPP TSG-RAN WG1 #85 May 23-27, 2016 Nanjing, China,total 8 pages.

\* cited by examiner

SYSTEM AND SCHEME OF SCALABLE OFDM NUMEROLOGY

RELATED APPLICATIONS

The present application is a continuation of U.S. patent application Ser. No. 16/036,569 filed Jul. 16, 2018, which is a continuation of U.S. patent application Ser. No. 15/169,553 filed May 31, 2016, which claims priority to U.S. Provisional Application No. 62/335,524 filed May 12, 2016, U.S. Provisional Application No. 62/320,252 filed Apr. 8, 2016, and U.S. Provisional Application No. 62/169,342 filed Jun. 1, 2015. The contents of all applications are hereby incorporated herein by reference.

FIELD

The present disclosure relates to a system and method for wireless communications and, in particular, to a system and method that incorporates scalable orthogonal frequency division multiplexing (OFDM) numerology that can apply to radio link transmissions in wireless networks.

BACKGROUND

In wireless communications networks, such as networks that adhere to the known Long-Term Evolution (LTE) standard transmissions over the wireless channel user preselected numerology. The term numerology is used to refer to the parameters used to define the waveform transmission. The numerology parameters include the sub-carrier spacing, the length of a cyclic prefix, the length of an OFDM symbol, the number of symbols contained in a Transmission Time Interval, and the duration of the TTI in milliseconds (ms). LTE networks typically support a 15 kHz sub carrier spacing across all transmission frequencies, with a TTI of 1 ms. It will be understood that a 15 kHz spacing typically results in a symbol rate of 66.7 µs, and that the length of a Cyclic Prefix is 4.69 µs.

For one example, the single subcarrier spacing may be limiting in very high speed mobility scenarios (e.g., 500 Km/h), which may incur high Doppler frequency shift. For another example, the single subcarrier spacing may be limiting in scenarios in which high radio frequency bands, such as 10 GHz bands, are employed, where phase noise may lead to large frequency shift. In such cases, 15 kHz may not be wide enough to accommodate the Doppler impact in frequency domain. On the other hand, low cost devices employing Machine-Type Communications (MTC) or Device to Device (D2D) communications may use narrower frequency bandwidth to enhance coverage and save energy. In such cases, subcarrier spacing can be narrower than that used in networks such as LTE.

SUMMARY

For a wireless communications system, scalable orthogonal frequency division multiplexing (OFDM) numerology is incorporated in a manner that can apply to radio link transmissions in future wireless network for frequency division duplex (FDD) and time division duplex (TDD) communications.

According to a first aspect is a method for configuring communications, with a communication device, using orthogonal frequency division multiplexing (OFDM). The method includes receiving an indication of a value of a first subcarrier spacing and a value of a first sub-frame duration for a first type of numerology signal to be applied to a first sub-frame of OFDM symbols, and receiving an indication of a value of a second subcarrier spacing and a value of a second sub-frame duration for a second type of numerology signal to be applied to a second sub-frame of OFDM signals. The value of the first subcarrier spacing has scaled relationship to the value of the second subcarrier spacing and the value of the first sub-frame duration has a scaled relationship to the value of the second sub-frame duration.

In some configurations, the method also includes transmitting a signal configured according to the first type of numerology signal on a first frequency sub-band, and transmitting a signal configured according to the second type of numerology signal on a second frequency sub-band concurrently with the transmitting of the signal configured according to the first type of numerology signal on the first frequency sub-band. In some examples the scaled relationship of the value of the first subcarrier spacing to the second subcarrier spacing involves multiplication by a first scaling factor, and the scaled relationship of the value of the first sub-frame duration to the second sub-frame duration involves multiplication by a second scaling factor, and wherein the first scaling factor is reciprocal of the second scaling factor. In some examples, the first sub-frame duration comprises a sum of the duration of an OFDM symbol useful part and a cyclic prefix part for all of the OFDM symbols in the first sub-frame, and the second sub-frame duration comprises a sum of the duration of an OFDM symbol useful part and a cyclic prefix part for all of the OFDM symbols in the second sub-frame, and the method comprises receiving an indication of a value of a first cyclic prefix duration for the first type of numerology signal and an indication of a value of a second cyclic prefix duration to be applied to the second for the first type of numerology signal, wherein the first cyclic prefix duration has a scaled relationship to the value of the second cyclic prefix duration.

In some configurations the first sub-frame and second sub-frame are each transmitted in a first frequency sub-band, the method including receiving an indication of a value of a third subcarrier spacing, and a value of a third sub-frame duration for a third type of numerology signal to be applied to a third sub-frame of OFDM symbols, wherein the third sub-frame duration is an integer multiple of one or both of the first and second sub-frame durations, and the third sub-frame is transmitted in a second frequency sub-band concurrently with the first or second sub-frames.

According to a further aspect there is provided a user equipment configured for orthogonal frequency division multiplexing (OFDM), the user equipment including a memory storing instructions and a processor configured, by the instructions, to perform one or more of the methods summarized above. In some examples, the processor configures the device to: receive an indication of a value of a first subcarrier spacing and a value of a first sub-frame duration for a first type of numerology signal, and receive an indication of a value of a second subcarrier spacing and a value of a second sub-frame duration for a second type of numerology signal, wherein the value of the first subcarrier spacing has scaled relationship to the value of the second subcarrier spacing and the value of the first sub-frame duration has a scaled relationship to the value of the second sub-frame duration.

Another aspect provides method for configuring communications, with a communication device, using orthogonal frequency division multiplexing (OFDM), the method including: transmitting an indication of a value of a first subcarrier spacing and a value of a first sub-frame duration for a first type of numerology signal, and transmitting an indication of a value of a second subcarrier spacing and a value of a second sub-frame duration for a second type of numerology signal, wherein the value of the first subcarrier spacing has scaled relationship to the value of the second subcarrier spacing and the value of the first sub-frame duration has a scaled relationship to the value of the second sub-frame duration.

In some configurations, the method comprises receiving a signal configured according to the first type of numerology signal on a first frequency sub-band, and receiving a signal configured according to the second type of numerology signal on a second frequency sub-band concurrently with the receiving of the signal configured according to the first type of numerology signal on the first frequency sub-band. In some examples, the scaled relationship of the value of the first subcarrier spacing to the second subcarrier spacing involves multiplication by a first scaling factor and the scaled relationship of the value of the first sub-frame duration to the second sub-frame duration involves multiplication by a second scaling factor, and wherein the first scaling factor is reciprocal of the second scaling factor. In some examples, the first sub-frame duration comprises the duration of an OFDM symbol useful part and a cyclic prefix part for a defined number of OFDM symbols, the method further comprises transmitting an indication of a value of a first cyclic prefix duration for the first type of numerology signal and an indication of a value of a second cyclic prefix duration to be applied to the second for the first type of numerology signal, wherein the first cyclic prefix duration has a scaled relationship to the value of the second cyclic prefix duration.

In some configurations, the first sub-frame and second sub-frame are each transmitted in a first frequency sub-band, and the method includes transmitting an indication of a value of a third subcarrier spacing, and a value of a third sub-frame duration for a third type of numerology signal to be applied to a third sub-frame of OFDM symbols, wherein the third sub-frame duration is an integer multiple of one or both of the first and second sub-frame durations, and the third sub-frame is transmitted in a second frequency sub-band concurrently with the first or second sub-frames.

A further aspect is directed to a base station configured for orthogonal frequency division multiplexing (OFDM), the base station including a memory storing instructions and a processor configured, by the instructions, to perform the transmitting operations summarized above, including, for example, to transmit an indication of a value of a first subcarrier spacing and a value of a first sub-frame duration for a first type of numerology signal, and to transmit an indication of a value of a second subcarrier spacing and a value of a first sub-frame duration for a second type of numerology signal, wherein the value of the first subcarrier spacing has scaled relationship to the value of the second subcarrier spacing and the value of the first sub-frame duration has a scaled relationship to the value of the second sub-frame duration.

According to a further aspect there is provided a device for transmitting information in a wireless network, comprising: a processor, a memory coupled to the processor, the memory storing executable instructions and at least a first set parameters for a first type of OFDM signal associated with a first subcarrier spacing and a first sub-frame duration and a second set of parameters for a second type of OFDM signal associated with a second subcarrier spacing and a second sub-frame duration, wherein a value of the first subcarrier spacing has scaled relationship to a value of the second subcarrier spacing and a value of the first sub-frame duration has a scaled relationship to a value of the second sub-frame duration, the executable instructions, when executed, causing the device to: selectively apply either the first set of parameters or the second set of parameters to OFDM symbols transmitted by the device.

In some configurations, the first sub-frame duration that corresponds to a total transmission time duration for transmitting a specified number of OFDM symbols using the first set of parameters, and the second sub-frame duration that corresponds to a total transmission time duration for transmitting the same specified number of OFDM symbols using the second set of parameters. In some examples, the device is configured to apply the first set of parameters to OFDM symbols transmitted in a first frequency sub-band and apply the second set of parameters to OFDM symbols transmitted in a second frequency sub-band. In some examples, the device is configured to transmit concurrently in the first and second frequency sub-bands. In some examples the is a user equipment device, and is configured to apply the first set of parameters to OFDM symbols intended for a first base station and the second set of parameters to OFDM symbols intended for a second base station. In some configurations, the device is configured to selectively apply either the first set of parameters or the second set of parameters based on information received through the wireless network from one or more base stations.

In some examples, the device is a base station. In some examples, the scaled relationship of the value of the first subcarrier spacing to the second subcarrier spacing involves multiplication by a first scaling factor and the scaled relationship of the value of the first sub-frame duration to the second sub-frame duration involves multiplication by a second scaling factor, and wherein the first scaling factor is reciprocal of the second scaling factor. In some examples each OFDM symbol transmitted using the first set of parameters each commence on a time boundary that aligns with an OFDM symbol transmitted using the second set of parameters. In some examples, the scaled relationship of the value of the first subcarrier spacing to the value of the second subcarrier spacing is $2^n$, where n is an integer. In some examples, the first subcarrier spacing or the second subcarrier spacing has a value of 15 kHz.

Other aspects and features of the present disclosure will become apparent to those of ordinary skill in the art upon review of the following description of specific implementations of the disclosure in conjunction with the accompanying figures. It is to be noted that some aspects or implementation of the aspects may be combined to generate new implementation with the understanding of those of ordinary skill in the art upon review the description. Those combination should also be considered as subject matter disclosed in this application.

BRIEF DESCRIPTION OF THE DRAWINGS

Reference will now be made, by way of example, to the accompanying drawings which show example implementations; and in which.

DETAILED DESCRIPTION

Figure 1:
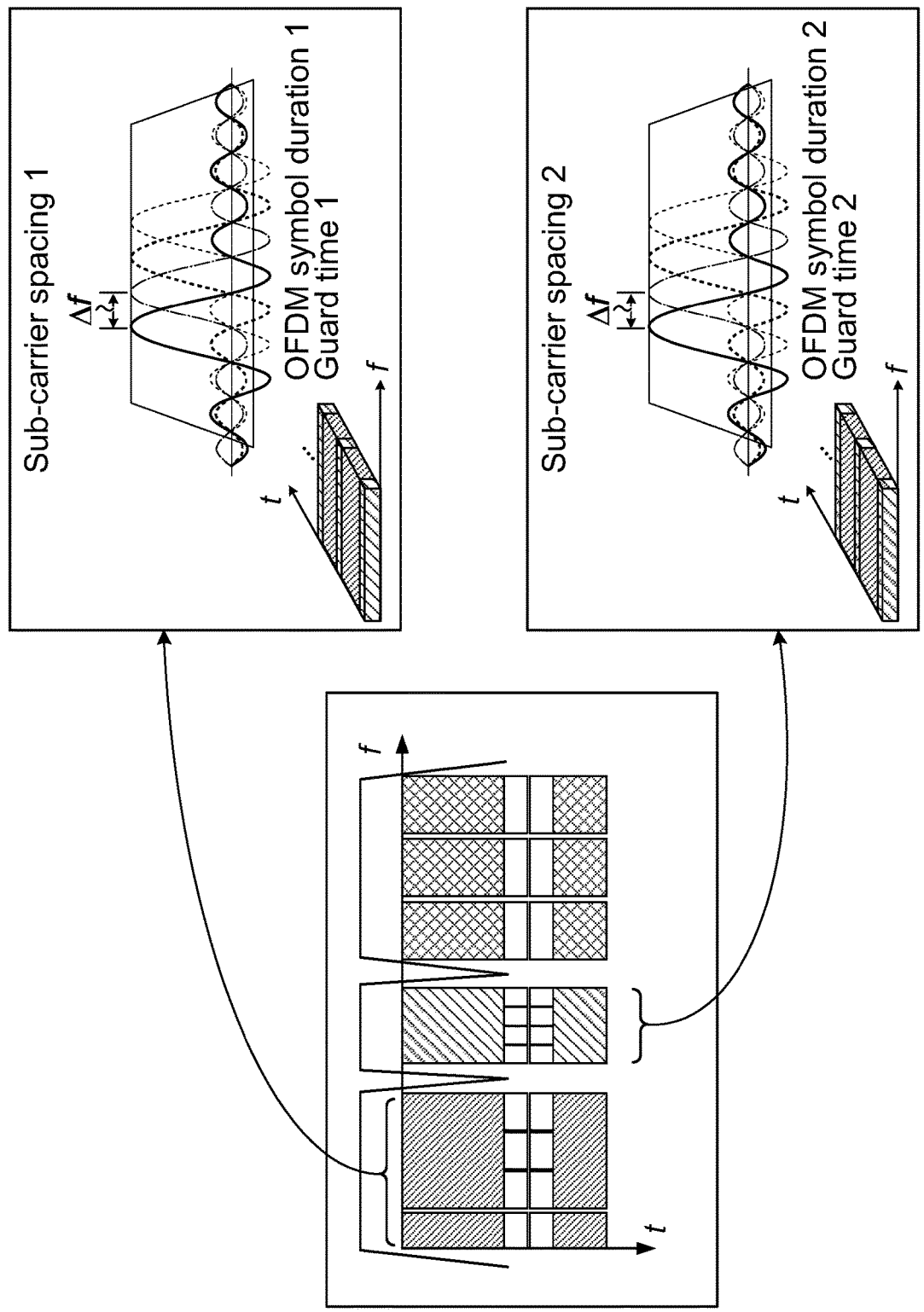
FIG. 1 illustrates an example of filtered OFDM according to example embodiments.

In conventional wireless networks, fixed numerologies have been employed to allow for an ease of design. The parameters of the numerology are typically set based on an understanding of the normal usage parameters of the network. In future networks, a more diverse set of needs must be served. Future networks may operate at a variety of different frequencies and serve a variety of different devices. Satisfying the diverse requirements for future wireless networks, such as fifth generation (5G) wireless networks, may be accomplished according to multiple approaches. In a first approach, which may be considered backward compatible with LTE, sampling frequencies and subcarrier frequencies are selected as integer multiples of the sampling frequencies and subcarrier frequencies already established for LTE. In a second approach, which may be considered to have so-called forward compatibility, the sampling frequencies and subcarrier frequencies are closely related to the sampling frequencies and subcarrier frequencies set for LTE, but are non-integer multiples. For the first approach, the backward compatible to LTE solution, there are two versions of the solutions based on how many symbols and cyclic prefix (CP) lengths in a sub-frame or transmission time interval. First version solutions are strictly compatible with LTE and involve using seven symbols or "7(1,6)" symbols in a sub-frame. The notation 7(1,6) represents a scheme with a first CP length for one symbol among the seven symbols and a second CP length for the other six symbols. For strict compatibility with LTE, the two CP lengths and the CP overhead in the base subcarrier spacing of 15 kHz are arranged to be the same as the two CP lengths and the CP overhead of current LTE. The second version solutions may be seen as closely compatible to LTE in the sense that their CP overhead and seven symbols in a sub-frame are the same as the CP overhead and the number of symbols used for current LTE, however, the symbols with different CP lengths are distributed in a manner distinct from LTE, e.g., 7(3,4) and 7(2,5).

In LTE, the parameter transmission time interval (TTI) is used to refer to the transmission time for a defined set of OFDM symbols. In some examples, TTI can also be referred to as a "transmission time unit (TTU)" or "sub-frame duration", which indicates the physical (PHY) layer symbol and frame time structure. Similar to TTI, TTU and "sub-frame duration" are each equal to the sum of the useful symbol duration and any symbol overhead such as cyclic prefix CP time for all of the OFDM symbols include in a set. For the second approach, with so-called forward compatibility, a flexible number of symbol configurations may be considered per transmission time interval (TTI). For any base SS, any number of symbols per TTI can be configured. This may be referred to as a discretionary N (dN) solution, based on the diverse requirements of applications, such as latency, control/data, TDD/FDD configurations, and co-existence, etc. As will be addressed hereinafter, the term "co-existence" relates to two or more sub-bands in use for a given connection employing compatible numerologies.

In example embodiments, for backward and forward compatibility solutions, the design methodology and criteria are as follows: for any base subcarrier spacing (15 kHz, 16.875 kHz, 17.5 kHz, 22.5 kHz, 16.5 kHz, etc.), the integer scalable subcarrier spacing (SS) values have an inversely scalable relationship over the CPs for a given CP overhead. Moreover, the integer scalable SS values have an inversely scalable relationship over both CPs and TTIs for a given number of symbols and given CP overhead. Larger TTIs can be concatenated by smaller TTIs, where a minimum TTI (or basic TTI unit) consists of the minimum number of symbols that is valid for implementation configurable in the TTI in such base subcarrier spacing. For one example, a scheme using 15 kHz subcarrier spacing is valid with seven symbols per TTI to make the scheme backward compatible to LTE. For another example, a scheme using 16.875 kHz subcarrier spacing is valid with one symbol per TTI for the implementation. The parameter (e.g., SS, TTI, CP) configurations are based on the diverse requirements of applications, such as latency, control/data, TDD/FDD configurations, and co-existence, etc.

In example embodiments, a communications network is provided that employs an OFDM transmission system in which the OFDM transmission parameters, such as subcarrier spacing parameter, can be configured to accommodate for different requests that may be placed on the network. Such requests may be related to factors such as speed of user equipment (UE), use of high frequency bands, or use of low cost, narrowly spaced frequency bandwidth communications devices. In this regard, OFDM numerology schemes are described herein that can be applied to radio frame structures for both FDD and TDD modes in a wireless network. Conveniently, the OFDM numerology schemes permit one or more of: multiple subcarrier spacing options; multiple transmission time interval (TTI) options; multiple cyclic prefix (CP) options; multiple carrier bandwidth options; and multiple fast Fourier Transform (FFT) sizes. Accordingly, the OFDM numerology schemes may be flexible enough to satisfy different requirements that may arise in the wireless network.

Example embodiments are described herein in which the parameters of a Filtered OFDM (F-OFDM) system may, in at least some applications, be configurable to support multiple waveforms, multiple access schemes and multiple frame structures, thereby accommodating a range of application scenarios and service requirements. By way of example, FIG. 1 illustrates an F-OFDM time-frequency signal plot illustrating the application of three sub-band filters to create OFDM subcarrier groupings with three different inter-sub-carrier spacings, OFDM symbol durations and guard periods. By enabling multiple parameter configurations, F-OFDM can, in at least some applications, allow for the optimal selection of parameters for each service group and, thus, may facilitate overall system efficiency.

In example embodiments, the OFDM numerology with scalable features are designed with TTIs that are linearly and inversely scaled with subcarrier spacing options to maintain a limited set of sampling frequencies for different FFT sizes. In some applications, such a configuration may reduce the complexity of the network interface used in communications equipment—for example, chipset implementation complexity in receiving devices may be reduced. In some example embodiments, optimized CP and TTI schemes are provided to achieve one-for-all applications for each subcarrier spacing option.

In an example embodiment, the communications system permits a plurality of subcarrier spacing (SS) choices ($SS_1$, $SS_2$, $SS_3$, ..., $SS_N$, where N≥2), where their useful symbol durations ($t_1$, $t_2$, $t_3$, ..., $t_N$) are the inverse of their respective subcarrier spacing values, CP durations ($cp_1$, $cp_2$, $cp_3$, ..., $cp_N$) and transmission time intervals ($TTI_1$, $TTI_2$, $TTI_3$, ..., $TTI_N$) to be configured. To reduce the overall sampling frequencies used by the communications network and the user equipment devices, in an example embodiment, a numerology scheme and criteria is employed such that, for any scaling factor (in this case, integer number M), we have:

$$\text{if } SS_i = M * SS_j, \text{ then } cp_i = \frac{cp_j}{M} \quad (1)$$

where $1 \leq i, j \leq N$, $i \neq j$ and where $TTI_i$ and $TTI_j$ each consists of one or more OFDM symbols, one OFDM symbol of which is made up of an OFDM useful part and a CP part. Each of $TTI_i$ and $TTI_j$ is scalable over $SS_i$ and $SS_j$ according to the same relationship as illustrated in equation (1) when $TTI_i$ and $TTI_j$ contain the same number of OFDM symbols. A scaling factor, M, can be any number (except for 1), including even numbers or $2^n$ values where n is an integer, based on design demand and requirements. Design demands and requirements may include, for example, minimizing the impacts of mobility, phase noise and/or delay spread of the environments. For the example embodiments with backward compatibility discussed herein, consider the following guidelines.

a) The set of subcarrier spacings $\{SS_i, i=1, 2, \ldots, N\}$ includes a base subcarrier spacing of 15 kHz (the same as the LTE subcarrier spacing) and subcarrier spacing that are versions of the base subcarrier spacing scaled up or down to generate higher and lower subcarrier spacings, such as 30 kHz, 60 kHz and 7.5 kHz. Furthermore, this scalable numerology is based on a base sampling frequency of 30.72 MHz, the same sampling frequency as used for LTE.

b) Any $TTI_i$ for a particular $SS_i$ may be associated with one or more OFDM symbols, where the symbols may have the same or different lengths in the TTI, and where different lengths, when they occur, are due to the use of different types of cyclic prefixes (CPs), each with different CP lengths.

c) Each OFDM symbol consists of a CP part (with time length of $T_{cp}$) and one useful OFDM signal part (with time length of $T_u$), totaling a symbol period of $T_{cp}+T_u$, where, for $SS_i$ with $TTI_i$, $$T_u = \frac{1}{SS_i}$$

and $T_{cp}$ is selected such that $T_{cp}+T_u$ is divisible by a sampling time $T_s$; for example, for 15 kHz SS applied to 20 MHz bandwidth with an FFT size of 2048, the sampling frequency is 30.72 MHz ($SS_i$*FFT size) and sampling time $T_s$=1/30.72 MHz=0.0326 μs.

d) For any $SS_i$, two or more small $TTI_i$ components can be concatenated into a large TTI.

e) The symbols comprising a TTI or a concatenated (larger) TTI, with different CP (and, thus, symbol) lengths, can be organized in different orders (or groupings, or symbol re-arrangements) to satisfy the diverse requirements such as TTI or sub-frame boundary alignment and/or symbol boundary alignments in FDD and/or TDD sub-frames/TTIs over different sub-bands/ numerology options (e.g., 15 kHz and 30 kHz subcarrier spacing) in the subcarrier bandwidth of the system. For example, if seven symbols (with two types of symbol lengths due to two types of CP lengths) in a TTI have 3- and 4-symbol groups, i.e., three s1 symbols and four s2 symbols, all the different combinations of the symbols in the TTI are valid to construct the TTI, e.g., s1s1s1s2s2s2s2, s2s2s2s2s1s1s1, s2s2s1s1s1s2s2, etc. For a concatenated TTI comprising two or more TTIs, all the component symbols in the concatenated TTI can have different order combinations across the concatenated TTI; for example, if two above TTIs are concatenated into a larger TTI which consists of 14 symbols (with six s1 symbols and eight s2 symbols), the different order combinations of the 14 symbols include:
s1s1s1s2s2s2s2s1s1s1s2s2s2s2;
s2s2s2s2s1s1s1s2s2s2s2s1s1s1;
s2s2s1s1s1s2s2s2s2s1s1s1s2s2;
s1s1s1s1s1s1s2s2s2s2s2s2s2s2;
s2s2s2s2s2s2s2s2s1s1s1s1s1s1; and
s2s2s2s2s1s1s1s1s1s1s2s2s2s2; etc.

The proposed scalable characteristics on numerology design are configured so that TDD sub-frame or TTI boundary alignment will naturally occur in terms of the smallest subcarrier spacing among the different numerology options. Moreover, an extension to TDD symbol boundary alignment is straightforward by additional symbol re-arrangement or re-organizing in TTIs or sub-frames, which was described above in e). As an example, considering three scalable subcarrier spacing 7(1,6) options with LTE normal CP (NCP) configurations: 15 kHz, 30 kHz and 60 kHz, each with its basic TTI/sub-frame unit consisting of 1 long OFDM symbol (S0=Tcp0+Tuseful) and 6 short OFDM symbols (S1-S6, each symbol length=Tcp1+Tuseful); for TDD co-existence, the symbol boundary can be readily aligned with respect to 15 kHz numerology symbol and sub-frame structure, as shown in Table A, where re-arranging symbol ordering in TTI(s) among different sub-band numerologies can make symbol and sub-frame boundaries perfectly aligned with respect to 15 kHz. Note that one basic TTI/sub-frame time unit of 15 kHz subcarrier spacing, e.g., consisting of 7 symbols, is equivalent to two basic time units of 30 kHz (e.g., with 14 symbols) and four basic time units of 60 kHz (e.g., with 28 symbols), all being 0.5 ms (i.e., the sub-frame boundary alignment in terms of the smallest subcarrier spacing numerology). Moreover, the long symbol location(s) for different numerology options in Table A can be re-arranged and put in a different location within a sub-frame; e.g., the first, any middle or the last symbol location based on demand, while the symbol boundary alignments can still be kept. In another example, for sub-carrier spacing configurations of 7.5 kHz, 15 kHz and 30 kHz (or more), the symbol and sub-frame boundary alignments can be made in a same way, by re-arranging symbols within sub-frames, where the boundary timings are in terms of 7.5 kHz subcarrier spacing numerology in this group, and one basic TTI/sub-frame time unit of 7.5 kHz subcarrier spacing, e.g., consisting of 7 symbols, is equivalent to two basic time units of 15 kHz (e.g., with 14 symbols) and four basic time units of 30 kHz (e.g., with 28 symbols), all being 1 ms:

spacings of 3.75 kHz, 7.5 kHz, 15 kHz, 30 kHz and 60 kHz. Notably, with 15 kHz as a base subcarrier spacing, 30 kHz is representative of an integer-scaled relationship (multiplication) with the integer being 2 and 60 kHz is representative of an integer-scaled relationship (multiplication) with the integer being 4. Additionally, 7.5 kHz is representative of an integer-scaled relationship (division) with the integer being 2, and 3.75 kHz with integer being 4. In the example set out in Table 1, the subcarrier spacings of 3.75 kHz, 7.5 kHz, 15 kHz, 30 kHz and 60 kHz have TTIs of 2 ms, 1 ms, 0.5 ms, 0.250 ms and 0.125 ms, respectively. The number of OFDM symbols for each TTI is set to seven for all five subcarrier spacing options. The notation of 7(1,6) may be interpreted to convey that, for the seven OFDM symbols, there is one symbol of a first type (Type 1) and six symbols of a second type (Type 2). In other words, the OFDM symbols within a parameter set can have more than one type of symbols co-existencing in different sub-bands. In the example set out in Table 1, the symbol types are distinguished by distinct CP length. For a subcarrier spacing of 7.5 kHz, for example, one of the seven symbols is a Type 1 symbol having a 10.42 μs CP and six of the symbols are Type 2 symbols having a 9.38

TABLE A

Symbol re-arrangement and boundary alignment for scalable numerology options

| 15 kHz | | | | S0 | | | | S1 | | | | S2 | | | | S3 | | | | S4 | | | | S5 | | | | S6 | | | |
|---|---|---|---|---|---|---|---|---|---|---|---|---|---|---|---|---|---|---|---|---|---|---|---|---|---|---|---|---|---|---|---|
| 30 kHz | | S0 | | S0 | | S1 | | S1 | | S2 | | S2 | | S3 | | S3 | | S4 | | S4 | | S5 | | S5 | | S6 | | S6 | | | | |
| 60 KHz | S0 | S0 | S0 | S0 | S1 | S1 | S1 | S1 | S2 | S2 | S2 | S2 | S3 | S3 | S3 | S3 | S4 | S4 | S4 | S4 | S5 | S5 | S5 | S5 | S6 | S6 | S6 | S6 | | | | |

In another embodiment, the scalable numerology 7(1,6) options can be generated in an another way to make symbol boundaries aligned, which is described as follows: Based on the smallest and base subcarrier spacing numerology with LTE normal CP (NCP) configuration in which one symbol with a long CP and six symbols with 6 short CPs, a fixed gap duration is defined as the difference of the two CP lengths; then any new numerology is generated and scaled (inversely) with the subcarrier spacing values in the sub-frame portion except for the fixed gap duration, for useful symbols and short CPs (including the first symbol with the long CP where to break into one short CP+the fixed gap duration). For example, in Table A, the symbol alignment is based on 15 kHz numerology. If we define a fixed gap duration for 15 kHz, g=Tcp0-Tcp1, then its first symbol S0=S0'+g, where the duration g is not scaled when generating other numerology options but the other sub-frame portion (except for g duration) is scalable. As a result, the symbol (and sub-frame) boundary alignment can be readily achieved in a way as shown in Table B, where each (scalable) numerology has a common fixed (or un-scaled) duration (g) that will be used as additional CP for the first symbol. Moreover, the location of the fixed gap duration, can be moving around and put in front of any symbol of (e.g., 15 kHz) numerology, such as the symbol S6 to increase this symbol CP length by g.

μs CP. Moreover, it should be clear that CP lengths contained in the corresponding OFDM symbols are also scalable for different subcarrier spacing options.

As can be seen from Table 1, for one type of numerology signal, subcarrier spacing and OFDM useful part have scaled relationship with the subcarrier spacing and OFDM useful part in other type of numerology signal. For example, in the numerology parameter set associated with subcarrier spacing 3.7 KHz, useful symbol duration (T_u) for each symbol is double the useful symbol duration (T_u) defined for subcarrier spacing 7.5 KHz. CP length and OFDM symbol in same type have scaled relationship with the CP length and OFDM symbol in other type of numerology signal while keeping the same CP overhead. For example, in the numerology parameter set associated with subcarrier spacing 3.7 KHz, the Type 1 CP/OFDM symbol and Type 2 CP/OFDM symbol lengths are double the respective Type 1 CP/OFDM symbol and Type 2 CP/OFDM symbol lengths defined for subcarrier spacing 7.5 KHz, such that the CP overhead for each parameter set is the same at 6.7%. Accordingly, TTI length has a scaled relationship with the TTI length in other type of numerology signal sets while keep the same number of symbols per TTI. In further, some

TABLE B

Another scalable numerology scheme and symbol/sub-frame boundary alignments

| 15 kHz | g | | | | S0' | | | | S1 | | | | S2 | | | | S3 | | | | S4 | | | | S5 | | | | S6 | | | |
|---|---|---|---|---|---|---|---|---|---|---|---|---|---|---|---|---|---|---|---|---|---|---|---|---|---|---|---|---|---|---|---|---|
| 30 kHz | g | | S0' | | S0' | | S1 | | S1 | | S2 | | S2 | | S3 | | S3 | | S4 | | S4 | | S5 | | S5 | | S6 | | S6 | | | |
| 60 KHz | g | S0' | S0' | S0' | S0' | S1 | S1 | S1 | S1 | S2 | S2 | S2 | S2 | S3 | S3 | S3 | S3 | S4 | S4 | S4 | S4 | S5 | S5 | S5 | S5 | S6 | S6 | S6 | S6 | | | |

Table 1 shows five sets of OFDM numerology options, with each set defining the following parameters: subcarrier spacing, useful symbol duration (T_u) for each symbol, CP length, # of symbols and TTI. In the example set out in the following Table 1, options are associated with subcarrier parameters have a proportional scaled relationship between different sets with other parameters. Some parameters have reciprocal proportional scaled relationship between different sets with other parameters.

TABLE 1

First example numerology

| Subcarrier spacing (KHz) | 3.75 | 7.5 | 15 | 30 | 60 |
|---|---|---|---|---|---|
| Useful duration T_u (us) | 266.67 | 133.33 | 66.67 | 33.33 | 16.67 |
| CP length (us) | 20.84, 18.76 | 10.42, 9.38 | 5.2, 4.7 | 2.60, 2.34 | 1.30, 1.17 |
| # of symbols per TTI | 7(1, 6) | 7(1, 6) | 7(1, 6) | 7(1, 6) | 7(1, 6) |
| TTI (ms) | 2 | 1 | 0.5 | 0.250 | 0.125 |
| CP overhead | 6.7% | 6.7% | 6.7% | 6.7% | 6.7% |
| (1) Type 1 CP period (us) | 20.83 | 10.42 | 5.21 | 2.60 | 1.30 |
| (2) Type 2 CP period (us) | 18.75 | 9.38 | 4.69 | 2.34 | 1.17 |
| (3) OFDM useful part period (us) | 266.67 | 133.33 | 66.67 | 33.33 | 16.67 |
| Type 1 OFDM symbol (us): (1) + (3) | 287.50 | 143.75 | 71.88 | 35.94 | 17.97 |
| Type 2 OFDM symbol (us): (2) + (3) | 285.42 | 142.71 | 71.35 | 35.68 | 17.84 |

The numerology of the example set out in the above Table 1 (implemented through CP design) may be considered to have been optimized for low CP overhead. One scalable set of numerology is applicable to the scalable FFT sizes and carrier bandwidths. Details for the two types of symbols used in each subcarrier spacing option are given in the following Table 2, where both Type-1 CP lengths and Type-2 CP lengths are scalable over the subcarrier spacing options.

TABLE 2

Detail for first example numerology of Table 1

| Subcarrier spacing (kHz) | 3.75 | 7.5 | 15 | 30 | 60 |
|---|---|---|---|---|---|
| FFT sizes | 8192 | 4096 | 2048 | 1024 | 512 |
| Sampling frequency (MHz) | 30.72 | 30.72 | 30.72 | 30.72 | 30.72 |
| Time sampling interval $T_s$ (μs) | 0.0326 | 0.0326 | 0.0326 | 0.0326 | 0.0326 |
| Type 1 CP: # of time samples | 640 | 320 | 160 | 80 | 40 |
| Type 2 CP: # of time samples | 576 | 288 | 144 | 72 | 36 |
| OFDM useful part: # samples | 8192 | 4096 | 2048 | 1024 | 512 |
| FFT sizes | 4096 | 2048 | 1024 | 512 | 256 |
| Sampling frequency (MHz) | 15.36 | 15.36 | 15.36 | 15.36 | 15.36 |
| Time sampling interval $T_s$ (μs) | 0.0651 | 0.0651 | 0.0651 | 0.0651 | 0.0651 |
| Type 1 CP: # of time samples | 320 | 160 | 80 | 40 | 20 |
| Type 2 CP: # of time samples | 288 | 144 | 72 | 36 | 18 |
| OFDM useful part: # samples | 4096 | 2048 | 1024 | 512 | 256 |
| FFT sizes | 2048 | 1024 | 512 | 256 | 128 |
| Sampling frequency (MHz) | 7.68 | 7.68 | 7.68 | 7.68 | 7.68 |
| Time sampling interval $T_s$ (μs) | 0.1302 | 0.1302 | 0.1302 | 0.1302 | 0.1302 |
| Type 1 CP: # of time samples | 160 | 80 | 40 | 20 | 10 |
| Type 2 CP: # of time samples | 144 | 72 | 36 | 18 | 9 |
| OFDM useful part: # samples | 2048 | 1024 | 512 | 256 | 128 |
| FFT sizes | 1024 | 512 | 256 | 128 | |
| Sampling frequency (MHz) | 3.84 | 3.84 | 3.84 | 3.84 | |
| Time sampling interval $T_s$ (μs) | 0.2604 | 0.2604 | 0.2604 | 0.2604 | |
| Type 1 CP: # of time samples | 80 | 40 | 20 | 10 | |
| Type 2 CP: # of time samples | 72 | 36 | 18 | 9 | |
| OFDM useful part: # samples | 1024 | 512 | 256 | 128 | |

In example embodiments of the present application, the described schemes can be applied to "one-for-all applications," in which one numerology for each subcarrier spacing (SS) can be applied to all feasible combinations of different scalable bandwidths and FFT sizes, as shown in Table 2. Notably, in the above Table 2, the highest sampling frequency has been limited to 30.72 MHz to illustrate an example of back-compatibility to LTE. It should be understood that it is not necessary to limit the highest sampling frequency when no back-compatibility is required. Higher or lower sampling frequencies (relative to LTE sampling frequencies) can be employed in future wireless networks.

For any subcarrier spacing, different FFT sizes (and, thus, sampling frequencies) may be used based on different system bandwidths. For example, with 30 kHz subcarrier spacing, the following Table 3 lists an applicable relationship between system bandwidths and FFT sizes (and sampling frequencies).

TABLE 3

Applicable relationship between system bandwidths and FFT sizes for subcarrier spacing 30 kHz.

| Bandwidth (MHz) | 2.5 | 5 | 10 | 15 | 20 |
|---|---|---|---|---|---|
| FFT Size | 128 | 256 | 512 | 512 | 1024 |
| Sampling Frequency (MHz) | 3.84 | 7.68 | 15.36 | 15.36 | 30.72 |

As noted above, the scaling factor, M, can be any number (except for 1), including even numbers or $2^n$ values where n is an integer, based on design demand and requirements. In some examples, a scaling factor of M=2" is applied, with 15 kHz subcarrier spacing used as a as baseline, where n is an integer. Based on a 15 kHz base, a 2^n scaling relationship, can provide subcarrier spacing options of: (going up) 30, 60, 120 kHz . . . , and (going down) 7.5, 3.75 kHz, . . . .

The following two Tables 4 and 5 illustrate two more example sets of options for the cases of seven symbols per TTI. In particular, Table 4 provides a scalable OFDM numerology with a symbol composition per TTI of 7(2,5) and, in Table 5, combinations of FFT sizes and bandwidths for the numerology of Table 4 are presented.

TABLE 4

Second example numerology

| Subcarrier spacing (kHz) | 7.5 | 15 | 30 | 60 |
|---|---|---|---|---|
| Useful duration $T_u$ (µs) | 133.33 | 66.67 | 33.33 | 16.67 |
| CP length (µs) (2) | 7.29 | 3.65 | 1.82 | 0.91 |
| CP length (µs) (5) | 10.42 | 5.21 | 2.60 | 1.30 |
| # of symbols per TTI | 7(2, 5) | 7(2, 5) | 7(2, 5) | 7(2, 5) |
| TTI (ms) | 1 | 0.5 | 0.250 | 0.125 |
| CP overhead (%) | 6.67 | 6.67 | 6.67 | 6.67 |
| (1) Type 1 CP period (µs) | 7.2917 | 3.6458 | 1.8229 | 0.9115 |
| (2) Type 2 CP period (µs) | 10.4167 | 5.2083 | 2.6042 | 1.3021 |
| (3) OFDM useful part period (µs) | 133.3333 | 66.6667 | 33.3333 | 16.6667 |
| Type 1 OFDM symbol (µs): (1) + (3) | 140.6250 | 70.3125 | 35.1563 | 17.5781 |
| Type 2 OFDM symbol (µs): (2) + (3) | 143.7500 | 71.8750 | 35.9375 | 17.9688 |

TABLE 5

Detail for second example numerology of Table 4

| Subcarrier spacing (kHz) | 7.5 | 15 | 30 | 60 |
|---|---|---|---|---|
| FFT sizes | 4096 | 2048 | 1024 | 512 |
| Subcarrier spacing (kHz) | 7.5 | 15 | 30 | 60 |
| Sampling frequency (MHz) | 30.72 | 30.72 | 30.72 | 30.72 |
| Time sampling interval $T_s$ (µs) | 0.0326 | 0.0326 | 0.0326 | 0.0326 |
| Type 1 CP: # of time samples | 224 | 112 | 56 | 28 |
| Type 2 CP: # of time samples | 320 | 160 | 80 | 40 |
| OFDM useful part: # samples | 4096 | 2048 | 1024 | 512 |
| FFT sizes | 2048 | 1024 | 512 | 256 |
| Sampling frequency (MHz) | 15.36 | 15.36 | 15.36 | 15.36 |
| Time sampling interval $T_s$ (µs) | 0.0651 | 0.0651 | 0.0651 | 0.0651 |
| Type 1 CP: # of time samples | 112 | 56 | 28 | 14 |
| Type 2 CP: # of time samples | 160 | 80 | 40 | 20 |
| OFDM useful part: # samples | 2048 | 1024 | 512 | 256 |
| FFT sizes | 1024 | 512 | 256 | 128 |
| Sampling frequency (MHz) | 7.68 | 7.68 | 7.68 | 7.68 |
| Time sampling interval $T_s$ (µs) | 0.1302 | 0.1302 | 0.1302 | 0.1302 |
| Type 1 CP: # of time samples | 56 | 28 | 14 | 7 |
| Type 2 CP: # of time samples | 80 | 40 | 20 | 10 |
| OFDM useful part: # samples | 1024 | 512 | 256 | 128 |
| FFT sizes | 512 | 256 | 128 | |
| Sampling frequency (MHz) | 3.84 | 3.84 | 3.84 | |
| Subcarrier spacing (kHz) | 7.5 | 15 | 30 | 60 |
| Time sampling interval Ts (µs) | 0.2604 | 0.2604 | 0.2604 | |
| Type 1 CP: # of time samples | 28 | 14 | 7 | |
| Type 2 CP: # of time samples | 40 | 20 | 10 | |
| OFDM useful part: # samples | 512 | 256 | 128 | |

Differences between Table 1 and Table 4 include Table 1 providing greater CP length (resulting in greater OFDM symbol length) options, as well as the groupings of the same symbol lengths in each TTI. For example, with different Type-1 and Type-2 CP lengths in the designs, Table 4 provides a symbol composition per TTI of 7(2,5). In contrast, Table 1 provides a symbol composition per TTI of 7(1,6).

Tables 6 and 7, which follow, illustrate two more example sets of options for the cases of seven symbols per TTI. In particular, Table 6 provides a scalable OFDM numerology with a symbol composition per TTI of 7(3,4) and, in Table 7, combinations of FFT sizes and bandwidths for the numerology of Table 6 are presented.

TABLE 6

Third example numerology

| Subcarrier spacing (kHz) | 3.75 | 7.5 | 15 | 30 | 60 |
|---|---|---|---|---|---|
| Useful duration $T_u$ (µs) | 166.67 | 133.33 | 66.67 | 33.33 | 16.67 |
| CP length (µs) (3) | 16.67 | 8.33 | 4.17 | 2.08 | 1.04 |
| CP length (µs) (4) | 20.83 | 10.42 | 5.21 | 2.60 | 1.30 |
| # of symbols per TTI | 7(3, 4) | 7(3, 4) | 7(3, 4) | 7(3, 4) | 7(3, 4) |
| TTI (ms) | 2 | 1 | 0.5 | 0.25 | 0.125 |
| CP overhead (%) | 6.67 | 6.67 | 6.67 | 6.67 | 6.67 |

TABLE 7

Detail for the third numerology of Table 6

| Subcarrier spacing (kHz) | 3.75 | 7.5 | 15 | 30 | 60 |
|---|---|---|---|---|---|
| FFT sizes | 8192 | 4096 | 2048 | 1024 | 512 |
| Sampling freq. (MHz) | 30.72 | 30.72 | 30.72 | 30.72 | 30.72 |
| Time sampling interval $T_s$ (µs) | 0.0326 | 0.0326 | 0.0326 | 0.0326 | 0.0326 |
| Type 1 CP: # of time samples | 512 | 256 | 128 | 64 | 32 |
| Type 2 CP: # of time samples | 640 | 320 | 160 | 80 | 40 |
| OFDM useful part: # samples | 8192 | 4096 | 2048 | 1024 | 512 |
| FFT sizes | 4096 | 2048 | 1024 | 512 | 256 |
| Sampling freq. (MHz) | 15.36 | 15.36 | 15.36 | 15.36 | 15.36 |

TABLE 7-continued

Detail for the third numerology of Table 6

| Subcarrier spacing (kHz) | 3.75 | 7.5 | 15 | 30 | 60 |
|---|---|---|---|---|---|
| Time sampling interval $T_s$ (μs) | 0.0651 | 0.0651 | 0.0651 | 0.0651 | 0.0651 |
| Type 1 CP: # of time samples | 256 | 128 | 64 | 32 | 16 |
| Type 2 CP: # of time samples | 320 | 160 | 80 | 40 | 20 |
| OFDM useful part: # samples | 4096 | 2048 | 1024 | 512 | 256 |
| FFT sizes | 2048 | 1024 | 512 | 256 | 128 |
| Sampling freq. (MHz) | 7.68 | 7.68 | 7.68 | 7.68 | 7.68 |
| Time sampling interval $T_s$ (μs) | 0.1302 | 0.1302 | 0.1302 | 0.1302 | 0.1302 |
| Type 1 CP: # of time samples | 128 | 64 | 32 | 16 | 8 |
| Type 2 CP: # of time samples | 160 | 80 | 40 | 20 | 10 |
| OFDM useful part: # samples | 2048 | 1024 | 512 | 256 | 128 |
| FFT sizes | 1024 | 512 | 256 | 128 | 64 |
| Sampling freq. (MHz) | 3.84 | 3.84 | 3.84 | 3.84 | 3.84 |
| Time sampling interval $T_s$ (μs) | 0.2604 | 0.2604 | 0.2604 | 0.2604 | 0.2604 |
| Type 1 CP: # of time samples | 64 | 32 | 16 | 8 | 4 |
| Type 2 CP: # of time samples | 80 | 40 | 20 | 10 | 5 |
| OFDM useful part: # samples | 1024 | 512 | 256 | 128 | 64 |

Differences between Table 1 and Table 6 include Table 6 providing greater CP length (resulting in greater OFDM symbol length) options, as well as the groupings of the same symbol lengths in each TTI. For example, with different Type-1 and Type-2 CP lengths in the designs, Table 6 provides a symbol composition per TTI of 7(3,4). In contrast, Table 1 provides a symbol composition per TTI of 7(1,6).

Figure 2:
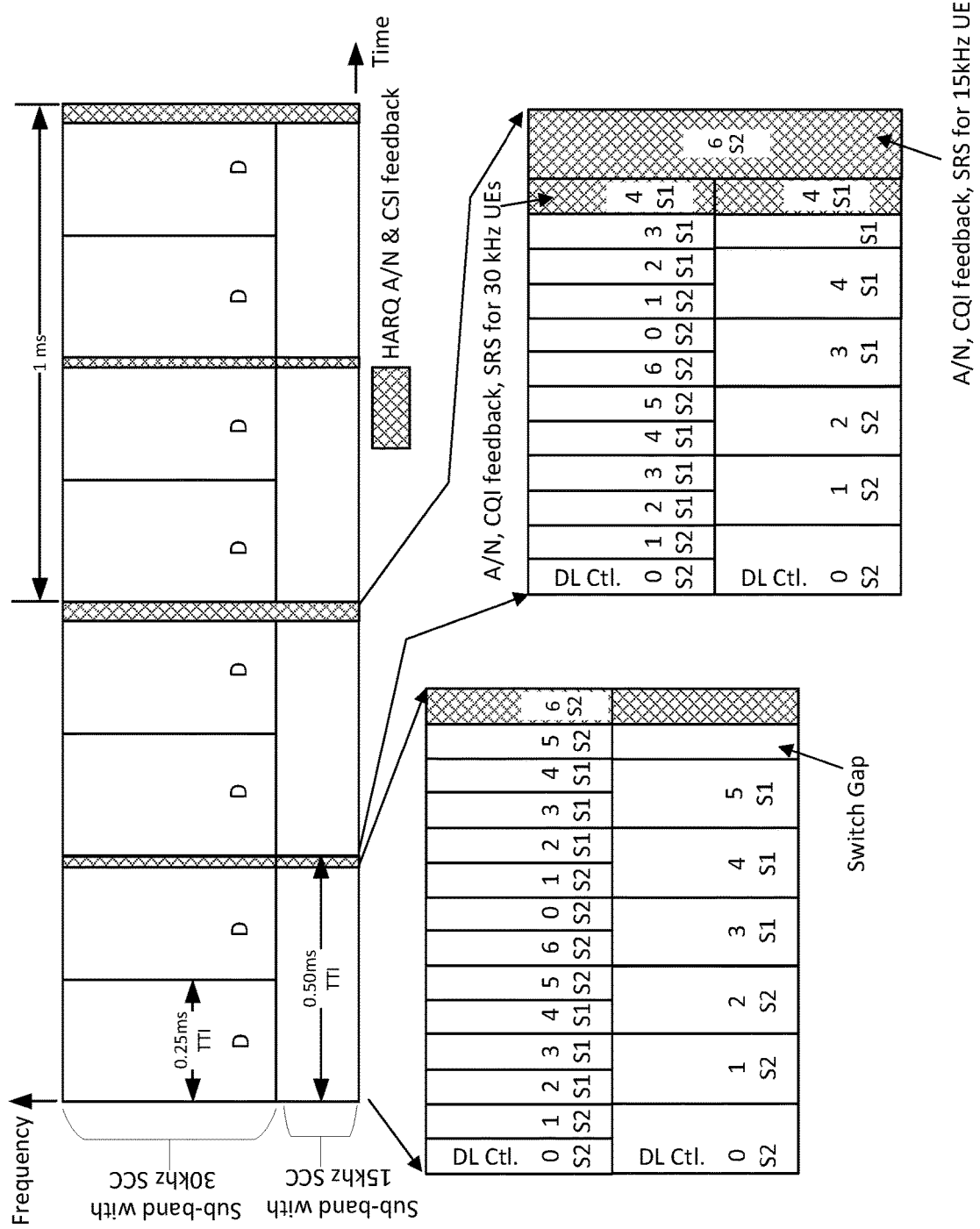
FIG. 2 is a block diagram illustrating an example in which transmission time interval (TTI) boundary and timing alignment is achieved by re-ordering or re-arranging OFDM symbols in TTI(s)

In some examples, TTI boundary and timing alignment of different numerology schemes used in neighboring TDD sub-bands can be applied to mitigate against downlink-uplink cross interference between the sub-bands. In this regard, FIG. 2 provides an example where TTI boundary and timing alignment is achieved by re-ordering or re-arranging OFDM symbols in TTI(s). In FIG. 2, DL only frame structures are provided to support DL peak data rate, where 15 kHz and 30 kHz subcarrier spacing options, each with 7(3,4) symbols per TTI and basic time unit, are employed, respectively, in two sub-bands of a single carrier frequency bandwidth. Symbol details for 15 kHz are: S2 (66.67+5.2) us, S1 (66.67+4.17) us; Symbol details for 30 kHz details are: s2 (33.33+2.6) us, s1 (33.33+2.08) us. TTI boundary and timing alignment details between the two sub-bands are: 1) The timing alignment is with smaller subcarrier spacing 15 kHz TTI. Note that 1 TTI of 15 kHz is equivalent to 2 TTIs of 30 kHz by re-ordering the symbols. 2) There is a switching gap for DL/UL guard period (GP) and alignment. 3) There is UL timing alignment for ACK/NACK, CQI feedback and/or sound reference signals (SRS).

Using schemes proposed herein, numerology solutions can be determined for network and device applications in environments where delay spreads are varying, e.g., urban environments, rural environments, indoor environments, outdoor environments, small cell environments, large cell environments, etc. In example embodiments, multiple CP lengths are provided for each SS, thereby allowing for desired objectives to be achieved.

Example schemes designed to address support of high mobility in larger delay spread environments, e.g., rural areas, are presented in the following Table 8a. The schemes of Table 8a have longer CP lengths for larger subcarrier spacing options (e.g., 30 kHz and 60 kHz). Beneficially, the larger CPs in the schemes in Table 8a support high mobility in larger delay spread environments. Furthermore, these schemes support sub-band numerology co-existence. Scalable characteristics are maintained for given CP overheads, e.g., Table 8a includes schemes for CP overhead of 13.33% and for CP overhead of 6.7%.

TABLE 8a

Example numerology with different CP lengths

| | Subcarrier spacing (kHz) | | | | | |
|---|---|---|---|---|---|---|
| | 15 | 30 | 30 | 60 | 60 | 60 |
| Useful duration $T_u$ (μs) | 66.67 | 33.33 | 33.33 | 16.67 | 16.67 | 16.67 |
| CP length (μs) (1) | 5.2 | 5.73 | 2.6 | 2.86 | 1.3 | 3.65 |
| CP length (μs) (6 or 12) | 4.7 | 5.08 | 2.34 | 2.54 | 1.17 | 3.13 |
| # of symbols per TTI | 7(1, 6) | 13(1, 12) | 7(1, 6) | 13(1, 12) | 7(1, 6) | 25(10, 15) |
| TTI (ms) | 0.5 | 0.5 | 0.25 | 0.25 | 0.125 | 0.5 |
| CP overhead | 6.70% | 13.30% | 6.70% | 13.30% | 6.70% | 16.67% |

TABLE 8b

Example numerology with different CP lengths for subcarrier spacing 15 kHz and below.

| | Subcarrier spacing (KHz) | | | | | |
|---|---|---|---|---|---|---|
| | 3.75 | 3.75 | 3.75 | 7.5 | 7.5 | 15 |
| Useful duration $T_u$ (μs) | 266.67 | 266.67 | 266.67 | 133.33 | 133.33 | 66.67 |
| CP length (us) | 20.84, 18.76 | 66.67, 25 | 45.83 | 10.42, 9.38 | 29.17, 19.79 | 8.72, 7.36 |
| # of symbols per TTI | 7(1, 6) | 17(1, 16) | 16 | 7(1, 6) | 13(1, 12) | 27(1, 26) |
| TTI (ms) | 2 | 5 | 5 | 1 | 2 | 2 |
| CP overhead | 6.70% | 9.30% | 14.70% | 6.70% | 13.30% | 10.00% |

More example schemes designed to address support of coverage-oriented and larger delay spread environments are presented in Table 8b. Tables 8a and 8b can be applied to diverse usage or service scenarios and deployment scenarios. Such applications may, for example, include usage scenarios in future 5G (the fifth generation) networks, e.g., enhanced mobile broadband ("eMBB"), massive Machine-Type Communications ("mMTC") and Ultra-Reliable low-latency communications ("URLLC"). Based on different requirements in terms of delay spread, Doppler and phase noise impacts, etc., Table 8c in the following provides an example for application of different numerology schemes to the diverse application scenarios in 5G.

TABLE 8c

Example numerology applications to diverse usage scenarios of 5G network

| Usage/service scenarios | Subcarrier spacing: e.g., | CP length (us): e.g., | TTI length (ms): e.g., |
|---|---|---|---|
| eMBB | 15 kHz | (5.2, 4.7) | 0.5 |
| Broadcast MBSFN transmission | 7.5 kHz | (10.42, 9.38) | 1 |
| mMTC | 3.75 khHz | (20.84, 18.76) | 2 |
| | 7.5 kHz | (10.42, 9.38) | 1 |
| URLLC | 60 kHz | (1.3, 1.17) | 0.125 |

The above examples have shown various schemes with more than one type of CP length in symbols for a TTI, which schemes may be considered to be either strictly, 7(1,6), backward compatible with LTE or closely, 7(2,5) and 7(3,4), backward compatible with LTE.

In the following, numerology schemes are discussed in the context of a so-called "forward compatibility solution." The two type CP lengths in the current LTE system can be simplified by choosing a base subcarrier spacing different from the LTE subcarrier spacing of 15 kHz. For example, each of the subcarrier spacing options in a group that includes 16.875 kHz, 17.5 kHz, 22.5 kHz and 16.5 kHz have a convenient property in that the numerology of each of the subcarrier spacing options has only one-CP length in OFDM symbols within a TTI, and CP overheads that may be minimized. Moreover, a TTI can include as few as a single OFDM symbol, with the TTI durations being convenient values such as 0.0625 ms. Such a scheme may be referred to as a forward compatibility solution.

For the example embodiments with forward compatibility discussed herein, consider the following guidelines:

a) The set of subcarrier spacings $\{SS_i, i=1, 2, \ldots, N\}$ can be obtained in a scalable way from a base subcarrier spacing that is closely related to the LTE subcarrier spacing of 15 kHz and the LTE sampling frequency of 30.72 MHz. A new base sampling frequency may be defined by multiplying the LTE sampling frequency by a ratio, N/L, and a new base SS=LTE SS*N/L, where N, L are two positive integers.

b) For any base subcarrier spacing (16.875 kHz, 17.5 kHz, 22.5 kHz, 16.5 kHz, etc), the following design scheme is proposed:

Support single and appropriate CP lengths per subcarrier spacing and minimized CP overhead;

A single OFDM symbol good enough in a TTI; and

A discretionary number, N, of symbol(s) in a TTI (dN) can be configured, where N is a positive integer, and where TTI periods are scalable over N symbols.

As a result, any number of symbols (discretionary N symbols "dN") per TTI can be configured, based on requirements of latency, control/data, TDD/FDD and co-existence, etc. Such a design is referred to herein as a dN scheme.

In the following embodiment example, N=9 and L=8, the base subcarrier spacing is 16.875 kHz and the base sampling frequency is 34.56 MHz, there is a single CP length of 3.24 us and a single OFDM symbol duration of 0.0625 ms. For the base subcarrier spacing of 16.875 kHz, a TTI duration can be configured based on transmission and application latency requirements, which includes one or more OFDM symbols. Equivalently, a larger TTI can be formed by concatenating two or more smaller TTIs; as an example, the smallest TTI is 0.0625 ms (and includes only one OFDM symbol) in the following table, a 0.5 ms TTI can be formed by concatenating eight small (0.0625 ms) TTIs or two 0.25 ms TTIs.

TABLE 9

For SS = 16.875 kHz and $T_s$ = 0.0289 μs

| NumSymbols per TTI | $T_{cp}$ (μs) | $T_u$ (ms) | TTI (ms) | Overhead (%) |
|---|---|---|---|---|
| 1 | 3.2407 | 59.2593 | 0.0625 | 5.1852 |
| 2 | 3.2407 | 59.2593 | 0.125 | 5.1852 |
| 3 | 3.2407 | 59.2593 | 0.1875 | 5.1852 |
| 4 | 3.2407 | 59.2593 | 0.25 | 5.1852 |
| 5 | 3.2407 | 59.2593 | 0.3125 | 5.1852 |
| 6 | 3.2407 | 59.2593 | 0.375 | 5.1852 |
| 7 | 3.2407 | 59.2593 | 0.4375 | 5.1852 |
| 8 | 3.2407 | 59.2593 | 0.5 | 5.1852 |
| 16 | 3.2407 | 59.2593 | 1 | 5.1852 |

By selecting different appropriate N and L values, other base subcarrier spacing options may be considered, such as 17.5 kHz, 22.5 kHz, 16.5 kHz and 26.25 kHz for the so-called forward compatibility solution. Each of these options will have characteristics applicable to particular application scenarios and environments. These options are listed in the following Table 10.

TABLE 10

Options for base subcarrier spacing

| | Base SS (kHz) | | | |
|---|---|---|---|---|
| | 17.5 | 22.5 | 16.5 | 26.25 |
| Useful duration $T_u$ (μs) | 57.14 | 44.44 | 60.61 | 38.10 |
| CP length (μs) | 5.36 | 5.56 | 1.89 | 3.57 |
| # of symbols per TTI | 8 | 10 | 8 | 12 |
| TTI (ms) | 0.50 | 0.50 | 0.50 | 0.50 |
| CP overhead | 8.6% | 11.1% | 3.0% | 8.6% |

By using the base subcarrier spacing of 16.875 kHz, the scalable numerology can be generated by scaling this base subcarrier spacing up or down, just as has been discussed hereinbefore in the context of 15 kHz, with CP length and TTI length also scaled appropriately. The following two tables provide two generated numerology examples with the base subcarrier spacing of 16.875 kHz, where for the given CP overhead of 5.18%, CP time durations are inversely scalable with their respective subcarrier spacing values. Moreover, for a given number of symbols configured in each TTI (e.g., 7 or 8), the TTI periods are also inversely scalable with their respective subcarrier spacing values.

TABLE 11

Schemes with 16.875 kHz base subcarrier spacing (d7, 5.18%) scalable numerology

| | Subcarrier spacing (kHz) | | | | |
|---|---|---|---|---|---|
| | 4.219 | 8.438 | 16.875 | 33.75 | 67.5 |
| Useful duration $T_u$ (μs) | 237.04 | 118.52 | 59.26 | 29.63 | 14.81 |
| CP time (μs) | 12.96 | 6.48 | 3.24 | 1.62 | 0.81 |
| # of symbols per TTI | 7 | 7 | 7 | 7 | 7 |
| TTI (ms) | 1.750 | 0.875 | 0.438 | 0.219 | 0.109 |
| CP overhead | 5.18% | 5.18% | 5.18% | 5.18% | 5.18% |

TABLE 12

Schemes with 16.875 kHz base subcarrier spacing (d8, 5.18%) scalable numerology

| | Subcarrier spacing (kHz) | | | | |
|---|---|---|---|---|---|
| | 4.219 | 8.438 | 16.875 | 33.75 | 67.5 |
| Useful duration $T_u$ (μs) | 237.04 | 118.52 | 59.26 | 29.63 | 14.81 |
| CP time (μs) | 12.96 | 6.48 | 3.24 | 1.62 | 0.81 |
| # of symbols per TTI | 8 | 8 | 8 | 8 | 8 |
| TTI (ms) | 2.000 | 1.000 | 0.500 | 0.250 | 0.125 |
| CP overhead | 5.18% | 5.18% | 5.18% | 5.18% | 5.18% | dN numerology can be used with sub-bands for certain applications that can benefit from such a scheme. Such application may, for example, include enhanced mobile broadband ("eMBB"), massive Machine-Type Communications ("mMTC") and Ultra-Reliable low-latency communications ("URLLC"). When planned properly, the sub-bands can co-exist. Determining whether to implement co-existent sub-bands may depend on the requirements established for the applications for which the co-existent sub-bands will be used. Such requirements include requirement related to latency, TDD/FDD and environments.

One example shown below is to find a numerology for mMTC with <1 ms applications using subcarrier spacing of 8.438 kHz. For the $2^N$-symbol design, the appropriate solution is with the configuration of 4 symbols to construct the TTI of 0.5 ms (as 8 symbols will make TTI equal to 1 ms), while the proposed dN solution can configure 7 symbols in TTI, resulting in 0.875 ms (<1 m). The advantage of dN solution is the reduced control overhead. In this application, if half of a symbol is used for control, that is, the control overhead is 7% (=0.5/7) for the d7 solution, while the $2^N$ solution will incur a 12.5% (=0.5/4) control overhead.

TABLE 13

First example numerology for mMTC

| mMTC with <ms applications | $2^N$ solution: $2^2$ | dN Solution: d7 |
|---|---|---|
| Subcarrier spacing (kHz) | 8.438 | 8.438 | 8.438 |
| Useful duration $T_u$ (μs) | 118.52 | 118.52 | 118.52 |
| CP time (μs) | 6.48 | 6.48 | 6.48 |
| # of symbols per TTI | 8 | 4 | 7 |
| TTI (ms) | 1.000 | 0.500 | 0.875 |
| CP overhead | 5.18% | 5.18% | 5.18% |

The dN scheme proposed herein allows for a flexible number of symbol configurations per TTI rather than limiting a valid number of symbols per TTI to $2^N$. This allowance for both odd and even number of symbols in a TTI can make configurations for co-existence more flexible and efficient. In one example, a $2^N$ design has only a configuration of two symbols per TTI when using 8.438 kHz subcarrier spacing. Compared with a dN 3-symbol solution, if ¼ symbol is allocated for control, the overhead is 8.3% for dN design in contrast with 12.5% overhead for the $2^N$ design, which is shown in the following table.

TABLE 14

Second example numerology for mMTC

| mMTC with <ms applications | $2^N$ solution: $2^1$ and $2^2$ | | dN solution: d3 and d6 | |
|---|---|---|---|---|
| Subcarrier spacing (kHz) | 8.438 | 16.875 | 8.438 | 16.875 |
| Useful duration $T_u$ (μs) | 118.52 | 59.26 | 118.52 | 59.26 |
| CP time (μs) | 6.48 | 3.24 | 6.48 | 3.24 |
| # of symbols per TTI | 2 | 4 | 3 | 6 |
| TTI (ms) | 0.250 | 0.250 | 0.375 | 0.375 |
| CP overhead | 5.18% | 5.18% | 5.18% | 5.18% |

For dN numerology, more CP options can found to accommodate different applications and environments, where longer CP is required for higher subcarrier spacing options. It is expected that there is a trade-off between CP length and CP overhead for any given subcarrier spacing. The following table is an example to provide different CP options for one subcarrier spacing, i.e., (d15, 11.11%) and (d8, 5.18%) numerology, where an odd number of symbols in a TTI is required for the configuration to help achieve larger but single-type CP lengths with minimized CP overhead. It is noted that for any given CP overhead (either 5.18% or 11.11%), the scalability characteristics are kept for CP durations (inversely related) with subcarrier spacing values; moreover, for a given number of symbols per TTI, TTI durations are also (inversely) scaled with their respective subcarrier spacing values.

TABLE 15

Further options for base subcarrier spacing

| | Subcarrier spacing (kHz) | | | | |
|---|---|---|---|---|---|
| | 16.875 | 33.75 | 33.75 | 67.5 | 67.5 |
| Useful duration $T_u$ (μs) | 59.26 | 29.63 | 29.63 | 14.81 | 14.81 |
| CP time (μs) | 3.24 | 3.7 | 1.62 | 1.85 | 0.81 |
| # of symbols per TTI | 8 | 15 | 8 | 15 | 8 |
| TTI (ms) | 0.5 | 0.5 | 0.25 | 0.25 | 0.125 |
| CP overhead | 5.18% | 11.11% | 5.18% | 11.11% | 5.18% |

One more example in the following Table 16 is given for another base subcarrier spacing to generate the scalable numerology. This can be generated by scaling the base subcarrier spacing of 13.125 kHz (with the base sampling frequency of 26.88 MHz) up or down.

TABLE 16

Further example numerology

| | Subcarrier spacing (kHz) | | | |
|---|---|---|---|---|
| | 6.5625 | 13.125 | 26.25 | 52.5 |
| Useful duration $T_u$ (μs) | ~152.38 | ~76.19 | ~38.10 | ~19.05 |
| CP time (μs) | ~14.28 | ~7.14 | ~3.57 | ~1.785 |
| # of symbols per TTI | 12 | 12 | 12 | 12 |
| TTI (ms) | 2 | 1 | 0.5 | 0.25 |
| CP overhead | 8.5% | 8.5% | 8.5% | 8.5% |

The scalable numerology design can be applicable to different frequency bands, including sub 6 GHz, low frequency (0.7-3.0 GHz) and medium (3-6 GHz), bands, and high frequency or millimeter wave (mmW) Bands (6 GHz~100 GHz). As the high frequency bands usually require high subcarrier spacing due to the phase noise impacts, the symbol durations will be significantly shorter, or the CP overhead with will be inherently higher. To keep the scalable numerology benefits in terms of scalable sampling frequency feature and implementation simplicity, one embodiment is to propose a numerology for a base subcarrier spacing (e.g., 15 kHz, 16.875 kHz) with a relatively large CP overhead in lower frequency (e.g., 1~3 GHz) bands, and after scaling up the subcarrier spacing for higher frequency bands, the CP lengths and their overheads are still good enough to apply in the appropriate scenarios or environments.

Here are two embodiment examples on the scalable numerology designs for low (e.g., 700 MHz to 3 GHz), medium (e.g., 3-6 GHz) and high frequency (e.g., 6-100 GHz) bands.

TABLE 17

Backward-compatible numerology for multiple frequency bands

| | Frequency bands (GHz) | | |
|---|---|---|---|
| | Low (0.7-3.0) | Medium (3-6) | High (6-100) |
| Subcarrier spacing (kHz) | 15 | 30 | 600 |
| Useful duration $T_u$ (μs) | 66.67 | 33.33 | 1.67 |
| CP length (μs) | 5.2, 4.7 | 2.60, 2.34 | 0.130, 0.117 |
| # of symbols per TTI | 7(1,6) | 7(1,6) | 7(1,6) |
| TTI (ms) | 0.5 | 0.25 | 0.0125 |
| CP overhead | 6.7% | 6.7% | 6.7% |

TABLE 18

Forward-compatible numerology for multiple frequency bands

| | Frequency bands (GHz) | | |
|---|---|---|---|
| | Low (0.7-3.0) | Medium (3-6) | High (6-100) |
| Subcarrier spacing (kHz) | 22.5 | 45 | 450 |
| Useful duration $T_u$ (μs) | 44.44 | 22.22 | 2.22 |
| CP length (μs) | 5.56 | 2.78 | 0.28 |
| # of symbols per TTI | 10 | 10 | 10 |
| TTI (ms) | 0.5 | 0.25 | 0.025 |
| CP overhead | 11.1% | 11.1% | 11.1% |

Another design for low-cost devices in the mmW bands may require even larger subcarrier spacing to compensate for the phase noise with simplified transmission implementations. In such scenarios, reasonable CP lengths should be specifically designed with acceptable CP overheads, due to the fact that the higher subcarrier spacing will lead to extremely small symbol durations. Design considerations for these scenarios are given below;

a) Targeting solutions to frequency bands between 6 GHz and 100 GHz. The sampling frequency as multiples (e.g., 80) of LTE sampling frequency. Subcarrier spacing options based on frequency bands, measured phase noise and Doppler impact:

1.2 MHz for 6-28 GHz bands;
4.8 MHz for 28-50 GHz bands; and
9.6 MHz for 50-100 GHz bands.

Single symbol and TTI periods.
Assuming system/carrier bandwidths: ~1 GHz and ~2 GHz.
Numerology Design for mmW Bands.

An example of design for mmW numerology in terms of subcarrier spacing options follows.

TABLE 19 mmW (6+ GHz) band numerology design example

| | Subcarrier spacing (MHz) | | |
|---|---|---|---|
| | 1.2 | 4.8 | 9.6 |
| Useful duration $T_u$ (μs) | 0.833 | 0.208 | 0.104 |
| CP length (μs) | 0.208 | 0.052 | 0.026 |
| # of symbols per TTI | 48 | 192 | 384 |
| TTI (μs) | 50 | 50 | 50 |
| CP overhead | 20.00% | 20.00% | 20.00% |

An example of applicable relationship between system bandwidths and FFT sizes for mmW numerology follows.

TABLE 20

Applicable relationship between system bandwidths and FFT sizes

| | subcarrier spacing (MHz) | | | | | |
|---|---|---|---|---|---|---|
| | 1.2 | 1.2 | 4.8 | 4.8 | 9.6 | 9.6 |
| System bandwidth (GHz) | 1 | 2 | 1 | 2 | 1 | 2 |
| # of subcarriers w/10% guard band | 750 | 1500 | 187.5 | 375 | 93.75 | 187.5 |
| FFT Size | 1024 | 2048 | 256 | 512 | 128 | 256 |
| Sampling frequency (MHz) | 1228.8 | 2457.6 | 1228.8 | 2457.6 | 1228.8 | 2457.6 |

The above examples are given assuming that the subcarrier spacing is largely impacted by the phase noise without taking more complicated design and processing for the low-cost devices such as certain WiFi devices. On the other hand, there are other types of devices that can tolerate more implementation costs, such as certain LTE devices, to deal with the phase noise impacts. In such a case, the phase noise impacts can be significantly reduced in terms of its spectrum bandwidth. As a result, the subcarrier spacing in the design can be smaller than 1.2 MHz, such as 600 kHz and 300 kHz, for the high carrier frequency bands.

Based on the scalable design methodology described herein, the numerology designs for 300 kHz and 600 kHz subcarrier spacing options can be scaled down directly from the numerology for 1.2 MHz subcarrier spacing option. Table 21 provides a few numerology examples for 300 kHz and 600 kHz subcarrier spacing options, where the designs with different CP lengths are also given to satisfy the future system or 5G service requirements and deployment scenarios. It is noted that for any given CP overhead, CP lengths are reversely scalable to the subcarrier spacing values; e.g., for solution options with 20% CP overhead, CP length of 0.84 us for 300 kHz subcarrier spacing and 0.42 us for 600 kHz subcarrier spacing have a scalable integer of 2, and with an inversion relationship.

TABLE 21

Numerology examples for high carrier frequency (mmW) bands with different CP lengths.

| Subcarrier spacing (KHz) | 300 | 300 | 300 | 300 | 600 | 600 | 600 | 600 |
|---|---|---|---|---|---|---|---|---|
| Useful duration $T_u$ (us) | 3.33 | 3.33 | 3.33 | 3.33 | 1.67 | 1.67 | 1.67 | 1.67 |
| CP length (us) | 0.84 | 0.48, 0.44 | 0.32, 0.30 | 0.26, 0.24 | 0.42 | 0.24, 0.22 | 0.16, 0.15 | 0.13, 0.12 |
| # of symbols per TTI | 48 | 53(1, 52) | 55(1, 54) | 56(1, 55) | 48 | 53(1, 52) | 55(1, 54) | 56(1, 55) |
| TTI (ms) | 0.20 | 0.20 | 0.20 | 0.20 | 0.10 | 0.10 | 0.10 | 0.10 |
| CP overhead | 20% | 11.7% | 8.3% | 6.7% | 20% | 11.7% | 8.3% | 6.7% |

Machine-to-Machine (M2M) communication enables machines to communicate directly with one another and is expanding rapidly because of the potential to generate significant revenue for mobile network operators. In a 3rd Generation Partnership Project (3GPP) context, M2M is also referred to as Machine-Type Communication (MTC). Within an MTC network, devices may establish communication paths or links between each other. Such paths or links may be referenced as device-to-device ("D2D") paths or links. The certain low cost devices referenced hereinbefore may include devices communicating in an MTC network over a D2D path or link.

Set out in Table 22 below is another numerology example. In the option set of Table 22, each TTI consists of 7 OFDM symbols for every subcarrier spacing option, with subcarrier spacing options of 7.5, 15, 30 and 60 KHz having respective TTIs of 1, 0.5, 0.250 and 0.125 ms. There are two types of CP durations for the OFDM symbols in each TTI, with the previously mentioned notation of "number of symbols per TTI (number of Type 1 CP, Number of Type 2 CP)" being used to denote the symbol types such that "7(3,4)" means a total of 7 OFDM symbols with 3 Type 1 CP symbols (e.g. 8.33 us CP for 7.5 KHz), and 4 Type 2 CP symbols (e.g. 10.42 us CP for 7.5 KHz). In the example of Table 22, the OFDM numerology has been selected to provide a relatively low CP overhead of 6.7% for each subcarrier spacing option. One scalable set of numerology is applicable to the scalable FFT sizes and carrier bandwidth.

TABLE 22

Numerology example with CPs designed to provide 6.7% CP overhead for each SS option per TTI.

| | Subcarrier spacing (SS) (KHz) | | | |
|---|---|---|---|---|
| | 7.5 | 15 | 30 | 60 |
| Useful duration $T_u$ (us) | 133.33 | 66.67 | 33.33 | 16.67 |
| CP length (us) | 8.33, 10.42 | 5.2, 4.7 | 2.60, 2.34 | 1.04, 1.30 |
| # of symbols per TTI | 7(3,4) | 7(1,6) | 7(1,6) | 7(3,4) |
| TTI (ms) | 1 | 0.5 | 0.250 | 0.125 |

The details for two types of symbols used in each subcarrier spacing option of Table 22 are given below:

TABLE 23

Symbol type details for numerology of Table 22

| | Subcarrier spacing (KHz) | | | |
|---|---|---|---|---|
| | 7.5 | 15 | 30 | 60 |
| (1) Type 1 CP period (us) | 8.3333 | 5.2083 | 2.6042 | 1.0417 |
| (2) Type 2 CP period (us) | 10.4167 | 4.6875 | 2.3438 | 1.3021 |

TABLE 23-continued

Symbol type details for numerology of Table 22

| | Subcarrier spacing (KHz) | | | |
|---|---|---|---|---|
| | 7.5 | 15 | 30 | 60 |
| (3) OFDM useful part period (us) | 133.3333 | 66.6667 | 33.3333 | 16.6667 |
| Type 1 OFDM symbol (us): (1) + (3) | 141.6667 | 71.8750 | 35.9375 | 17.7083 |
| Type 2 OFDM symbol (us): (2) + (3) | 143.7500 | 71.3542 | 35.6771 | 17.9688 |

In "One-for-all applications", one numerology for each subcarrier spacing option SS can be applied to all feasible combinations of different scalable bandwidths and FFT sizes, shown in the Table 24A below:

TABLE 24A

Details for numerology example of Table 22.

| | Subcarrier spacing (KHz) | | | |
|---|---|---|---|---|
| | 7.5 | 15 | 30 | 60 |
| FFT sizes | 4096 | 2048 | 1024 | 512 |
| Sampling freq. (MHz) | 30.72 | 30.72 | 30.72 | 30.72 |
| Time sampling interval Ts (us) | 0.0326 | 0.0326 | 0.0326 | 0.0326 |
| Type 1 CP: # of time samples | 256 | 160 | 80 | 32 |

TABLE 24A-continued

Details for numerology example of Table 22.

| | Subcarrier spacing (KHz) | | | |
|---|---|---|---|---|
| | 7.5 | 15 | 30 | 60 |
| Type 2 CP: # of time samples | 320 | 144 | 72 | 40 |
| OFDM useful part: # samples | 4096 | 2048 | 1024 | 512 |
| FFT sizes | 2048 | 1024 | 512 | 256 |
| Sampling freq. (MHz) | 15.36 | 15.36 | 15.36 | 15.36 |
| Time sampling interval Ts (us) | 0.0651 | 0.0651 | 0.0651 | 0.0651 |
| Type 1 CP: # of time samples | 128 | 80 | 40 | 16 |
| Type 2 CP: # of time samples | 160 | 72 | 36 | 20 |
| OFDM useful part: # samples | 2048 | 1024 | 512 | 256 |
| FFT sizes | 1024 | 512 | 256 | 128 |
| Sampling freq. (MHz) | 7.68 | 7.68 | 7.68 | 7.68 |
| Time sampling interval Ts (us) | 0.1302 | 0.1302 | 0.1302 | 0.1302 |
| Type 1 CP: # of time samples | 64 | 40 | 20 | 8 |
| Type 2 CP: # of time samples | 80 | 36 | 18 | 10 |
| OFDM useful part: # samples | 1024 | 512 | 256 | 128 |
| FFT sizes | 512 | 256 | 128 | 64 |
| Sampling freq. (MHz) | 3.84 | 3.84 | 3.84 | 3.84 |
| Time sampling interval Ts (us) | 0.2604 | 0.2604 | 0.2604 | 0.2604 |
| Type 1 CP: # of time samples | 32 | 20 | 10 | 4 |
| Type 2 CP: # of time samples | 40 | 18 | 9 | 5 |
| OFDM useful part: # samples | 512 | 256 | 128 | 64 |

Thus, in a one for all design, the numerology of Table 22 can be applied to associated different FFT sizes and bandwidths. Table 24B sets out different FFT sizes and bandwidths for the numerology associated with the subcarrier spacing 30 Khz parameter set:

TABLE 24B

Different FFT Sizes and Bandwidths For Subcarrier Spacing 30 Khz Parameter Set

| | Bandwidth (MHz) | | | | |
|---|---|---|---|---|---|
| | 2.5 | 5 | 10 | 15 | 20 |
| FFT Size | 128 | 256 | 512 | 512 | 1024 |
| Sampling frequency (MHz) | 3.84 | 7.68 | 15.36 | 15.36 | 30.72 |

In a number of the numerology examples described above, it has been noted that different CP durations can be applied to the symbols within a TTI (or TTU). In examples noted above, the different CP durations have been described as Type 1 and Type 2 CP periods. In at least some examples different CP options can be applied for each subcarrier spacing SS option, with the Type 1 and Type 2 CP durations being different for the different options. In some examples, a CP having a longer duration (and more time samples) can be referred to as an "Extended Cyclic Prefix" (ECP), a CP having a shorter duration (and less time samples) relative to an ECP can be referred to as a "Normal Cyclic Prefix" (NCP), and a CP having a shorter duration and (and less time samples) relative to an NCP can be referred to as a "Mini" or "Miniature Cyclic Prefix" (MCP). In some examples, "NCP" refers to a cyclic prefix duration that provides a CP overhead of 6.7% and "ECP" refers to a refers to a cyclic prefix duration that provides a CP overhead of 20%. In some configurations, for example, an MCP may have a duration of 1~2~s, a NCP may have a duration of ~5 μs, and a ECP may have a duration of >5 μs. As noted above in respect of Table 8a, example schemes with different CP lengths for different carrier spacing can be designed to address support of high mobility in varying delay spread environments.

Thus, in some example embodiments, the provision of multiple CP length options for each subcarrier spacing (SS) can be applied to address different applications in different environments where delay spreads are varying—for example, environments such as urban, urban macro, urban dense, rural, indoor hotspot, small cells, large cells, high speed, among others. In this regard, Table 25 below provides numerology examples for supporting varying environments:

TABLE 25

Numerology Examples For Varying Environments

| Subcarrier spacing (KHz) | 7.5 | 7.5 | 7.5 | 15 | 30 | 30 | 60 | 60 |
|---|---|---|---|---|---|---|---|---|
| Useful duration T_u (us) | 133.33 | 133.33 | 133.33 | 66.67 | 33.33 | 33.33 | 16.67 | 16.67 |
| CP length (us) | 12.5, 14.58 | 8.33, 10.42 | 8.33, 10.42 | 5.2, 4.7 | 2.60, 2.34 | 4.95, 5.21 | 1.04, 1.30 | 3.65, 3.13 |
| # of symbols per TTI | 35 (15, 20) | 7(3, 4) | 35(15, 20) | 7(1, 6) | 7(1, 6) | 13(4, 9) | 7(3, 4) | 25 (10, 15) |
| TTI (ms) | 5 | 1 | 5 | 0.5 | 0.250 | 0.5 | 0.125 | 0.5 |
| CP overhead | 9.3% | 6.7% | 6.7% | 6.7% | 6.7% | 13.3% | 6.7% | 16.7% |
| Bandwidth (MHz) | 2.5 | 2.5 | 20 | 20 | 20 | 20 | 20 | 20 |
| FFT Size | 512 | 512 | 4096 | 2048 | 1024 | 1024 | 512 | 512 |
| Sampling frequency (MHZ) | 3.84 | 3.84 | 30.72 | 30.72 | 30.72 | 30.72 | 30.72 | 30.72 |

In the example of Table 25, the there are three numerology options for subcarrier spacing SS=7.5 Khz, and two numerology options each of subcarrier spacing SS=50 Khz and SS=60 Khz. The first two columns define two options for SS=7.5 KHz and, each providing a Type I CP duration and Type II CP duration falling within the ECP range. Such options may, in some applications, be suitable for MTC or D2D low cost devices.

In some examples, sub-frame boundary alignment of different numerology schemes used in neighboring TDD networks may be applied to mitigate against downlink-uplink cross interference between neighboring TTD sub-bands or cells. In this regard, Table 26 below sets out a further example of a OFDM numerology set that includes seven parameter sets (Set 1-Set7), each of which is associated with a unique subcarrier spacing. In the example of Table 26, a scaling factor of $2^m$ is applied, and the TTU length for each parameter set is integer divisible by the TTU length of any parameter set having a smaller TTU length. For example, the TTU length of 1 ms for set 1 (SS=7.5 Khz) divided by the integer 2 results in the TTU length of 0.5 ms for set 2(SS=15 Khz). In the example of Table 26, the TTU length is inversely scaled relative to the subcarrier spacing.

2 and sub-band 3) are frequency multiplexed, with different numerology applied to at least some of the sub-bands. For example, in FIG. 3, sub-band 1 employs a larger subcarrier spacing with a shorter sub-frame, or basic sub-frame unit, relative to sub-bands 2 and 3, to achieve n+0 HARQ timing. In example embodiments, the DL and UL are time multiplexed in each sub-band, with the DL time allotment including DL control channel, RS/Pilot and data components, and UL time allotment including data, HARQ A/N and/or CQI components. The signal component locations can vary from those shown in FIG. 12—for example, the RS/pilot location can precede the DL control channel based on requirements.

As can be seen in prior examples, different TTI/TTU/sub-frame length configurations can be applied for use in different frequency bands. Examples of various sub-frame or TTU configuration for sub 6 GHZ bands are set out in Table 27 below:

TABLE 26

Numerology Example for Mitigating UL-DL Cross Interference Between TDD Networks

| Parameters | Set 1 | Set 2 | Set 3 | Set 4 | Set 5 | Set 6 | Set 7 |
|---|---|---|---|---|---|---|---|
| Subcarrier-spacing(kHz) | 7.5 | 15 | 30 | 60 | 120 | 240 | 480 |
| OFDM symbol length (usec) | 133.33 | 66.67 | 33.3 | 16.67 | 8.33 | 4.17 | 2.08 |
| CP-length(usec) (NCP (Type 1, Type 2)/ECP) | (9.90, 9.38)/ 33.3 | (5.2, .69)/ 16.67 | (2.6, 2.34)/ 8.33 | (1.3, 1.17)/ 4.17 | (0.65, 0.59) * | (0.326, 0.29) * | (0.163, 0.15) * |
| No. of symbols per TTU: 7 (1 w/cp1, 6 w/cp2)/6 (single cp) | 7/6 | 7/6 | 7/6 | 7/6 | 7 | 7 | 7 |
| TTU length (ms) | 1 | 0.5 | 0.25 | 0.125 | 0.0625 | 0.03125 | 0.015625 |
| CP overhead(NCP/ECP) | 6.67%/ 20% | 6.67%/ 20% | 6.67%/ 20% | 6.67%/ 20% | 6.67% * | 6.67% * | 6.67% * |
| Note1(bands) | Sub 6 GHz | Sub 6 GHz | Sub 6 GHz | Sub 6 GHz/ 30 GHz | 30 GHz | 30 GHz | 70 GHz |

* Extended CP or CP re-arrangement can also apply on demand.

In the example of Table 26, Sets 1-3 are configured for sub 6 Ghz bands, Set 4 is configured for but sub 6 Ghz and >6 GHz, Sets 5 and 6 for the 30 Ghz band and Set 7 for the 70 Ghz band. For Sets 5~7, an extended CP (i.e., 20% CP overhead) can be applied as needed; also, CP lengths in OFDM symbols within a sub-frame or TTU can be adjusted (called here "CP re-arrangement") to satisfy the needs of, e.g., DL/UL switching, TDD timing and boundary alignment. For example, one CP duration in a certain symbol (of interest location in a sub-frame) can be extended by "borrowing" one or more CP samples from each CP of the other symbols.

Figure 3:
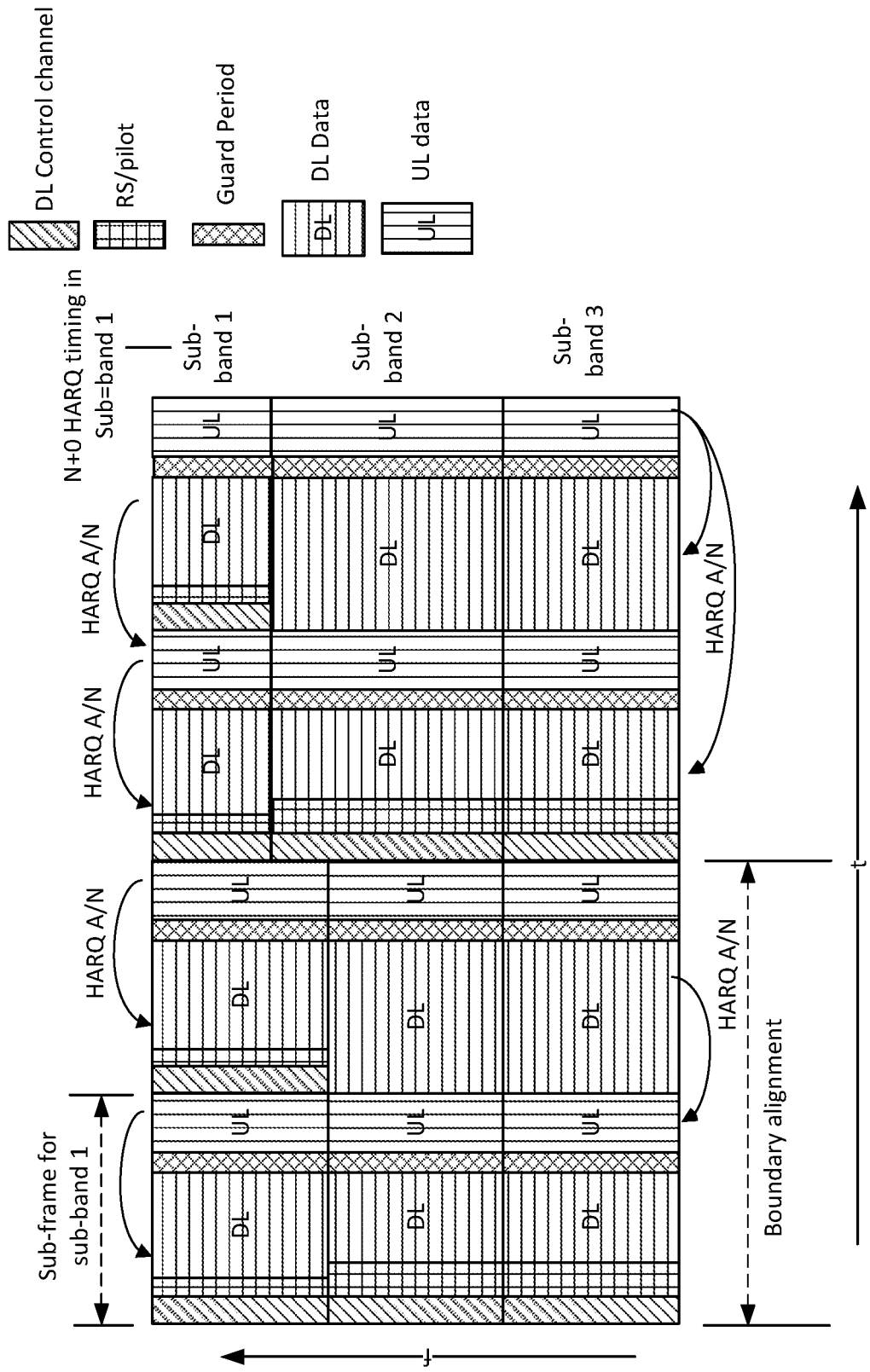
FIG. 3 is a block diagram illustrating numerology design to mitigate against UL-DL cross interference.

FIG. 3 is a block diagram illustrating numerology design to mitigate against UL-DL cross interference. In particular, FIG. 3 illustrates a TDD DL/UL sub-frame structure with n+0 Hybrid Automatic Repeat ReQuest (HARQ) timing. The illustrated example illustrates TDD sub-frames (SF) and adaptive scheduling of transmission units (TUs) that can combined with at least some of the numerology examples described herein. Multiple sub-bands (sub-band 1, sub-band

TABLE 27

Sub-Frame/TTU Configuration For Sub 6 GHZ Bands

Subframe/transmission units* (<6 GHz bands)

| Component type | # of symbols configurations | Associated sub-frame duration (ms) | | | |
|---|---|---|---|---|---|
| | | 7.5 kHz | 15 kHz | 30 kHz | 60 kHz |
| Sub-frame | 14 (NCP) or 12 (ECP) | 2 | 1 | 0.5 | 0.25 |
| | 7 (NCP) or 6 (ECP) | 1 | 0.5 | 0.25 | 0.125 |
| Scheduling/sub-frame with normal CP (NCP) | m (<7)** | 2x | x | x/2 | x/4 |
| | 7 | 1 | 0.5 | 0.25 | 0.125 |
| | 7n | n | 0.5n | 0.25n | 0.125n |

TABLE 27-continued

Sub-Frame/TTU Configuration For Sub 6 GHZ Bands

Subframe/transmission units*
(<6 GHz bands)

| Component type | # of symbols configurations | Associated sub-frame duration (ms) | | | |
|---|---|---|---|---|---|
| | | 7.5 kHz | 15 kHz | 30 kHz | 60 kHz |
| Scheduling/sub-frame with extended CP (ECP)*** | k (>=1) | 0.167k | 0.083k | 0.042k | 0.021k |

*Using 15 kHz as base subcarrier spacing with NCP configuration embodiment examples of co-existence of different adaptive frame structures with f-OFDM in a TDD system
**used for short latency, here as an example, x is estimated for all short symbols, x ~= 0.0713 * m; Note the longer-CP symbol(s) can also be used for, e.g., control/RS
***ECP with 20% CP overhead Examples of various sub-frame/TTU configuration for >6 GHZ bands are set out in Table 28 below:

TABLE 28

Examples of various sub-frame/TTU configuration for >6 GHZ bands.

Sub-frame/TTU (>6 GHz bands)

| Component type | Configurable # of symbols | Associated duration (us) | | | |
|---|---|---|---|---|---|
| | | 60 kHz | 120 kHz | 240 kHz | 480 kHz |
| Sub-frame | 7m (NCP) or n (>1, ECP)* | X* | X/2 | X/4 | X/8 |
| Scheduling/TTU with NCP | 7q (q >= 1)** | 125q | 62.5q | 31.25q | 15.63q |
| Scheduling/TTU with extended CP (ECP) | k (>=1)** | 20.83k | 10.42k | 5.21k | 2.60k |

*May limit m or n to only a few numbers, e.g., based on applicable frequency bands X = 125m for NCP or X = 20.83n for ECP configurations.
**To limit q or k to a few numbers in reducing the configuration options based on latency and subcarrier spacing options used: q and k are positive integers.

Table 29 below sets out a further example of a OFDM numerology set that includes seven parameter sets (Set 1-Set7), each of which is associated with a unique subcarrier spacing. The table 29 parameter sets are similar to those of table 26 set out above, except that the number of symbols per sub-frame is respectively 14, 28 and 56 for Sets 5, 6 and 7 (rather than 7), resulting in a sub-frame duration/TTU of 0.125 ms for each of the sets 5, 6 and 7.

TABLE 29

Further example of a OFDM numerology set that includes seven parameter sets

| Parameters | Set 1 | Set 2 | Set 3 | Set 4 | Set 5 | Set 6 | Set 7 |
|---|---|---|---|---|---|---|---|
| Subcarrier-spacing(kHz) | 7.5 | 15 | 30 | 60 | 120 | 240 | 480 |
| OFDM symbol length (usec) | 133.33 | 66.67 | 33.3 | 16.67 | 8.33 | 4.17 | 2.08 |
| CP-length(usec) (Normal CP (Type 1, Type 2)/ Extended CP | (9.90, 9.38)/ 33.3 | (5.2, 4.69)/ 16.67 | (2.6, 2.34)/ 8.33 | (1.3, 1.17)/ 4.17 | (0.65, 0.59) * | (0.326, 0.29) * | (0.163, 0.15) * |
| Number of symbols per sub-frame: Notes for basic components 7 or 6 symbols 7 (1 cp1, 6 cp2); single CP | 7/6 | 7/6 | 7/6 | 7/6 | 14 | 28 | 56 |
| Sub-frame length (ms) | 1 | 0.5 | 0.25 | 0.125 | 0.125 | 0.125 | 0.125 |
| CP overhead(NCP/ECP) | 6.67%/ 20% | 6.67%/ 20% | 6.67%/ 20% | 6.67%/ 20% | 6.67% * | 6.67% * | 6.67% * |

* Larger CP or CP rearrangement can also apply on demand

The parameters in Table 29 are specified from the general configuration information in Tables 27 and 28. Numerology parameter Sets 1~4 can be applicable to low carrier frequency bands (e.g., <6 GHz), and have a sub-frame (SF) as basic unit, with each sub-frame containing the same number of symbols (7), and the sub-frame duration being scalable (inversely) with the subcarrier spacing. Numerology parameter Sets 4~7 can be applicable to high carrier frequency bands (e.g., >6 GHz), with each sub-frame duration having a constant length of 0.125 ms, and the number of symbols per sub-frame being scalable with subcarrier spacing.

Accordingly, in the example numerology presented in Table 2, each of the parameter sets define the OFDM numerology parameters for a respective sub-carrier spacing. The defined parameters include the number of symbols per sub-frame, OFDM symbol length, and CP length. Two CP length options are specified for at least some of the parameter sets, namely normal CP (NCP) (which can include both a Type 1 CP and a Type 2 CP) and an extended CP (ECP). Multiple parameter set options (Sets 1~4) are provided for lower carrier frequency bands (<6 GHz bands), and across these parameter sets the number of symbols per sub-frame remains constant (7) with the result that the sub-frame duration changes by a scaled integer value inversely to the subcarrier spacing. For example, a halving of the sub-frame length correspond to a doubling of the subcarrier spacing. Multiple parameter set options (Sets 4~7) are also provided for higher carrier frequency bands (>6 GHz bands), and across these parameter sets the number of symbols per sub-frame is not constant, but rather changes by a scaled integer value that is the same applied to subcarrier spacing, and the sub-frame duration is kept constant (0.125 ms).

In the Example of Table 29, symbols in a sub-frame can be re-arranged, and CP lengths can be adjusted among different symbols within a sub-frame to satisfy certain requirements on demand.

Figure 4:
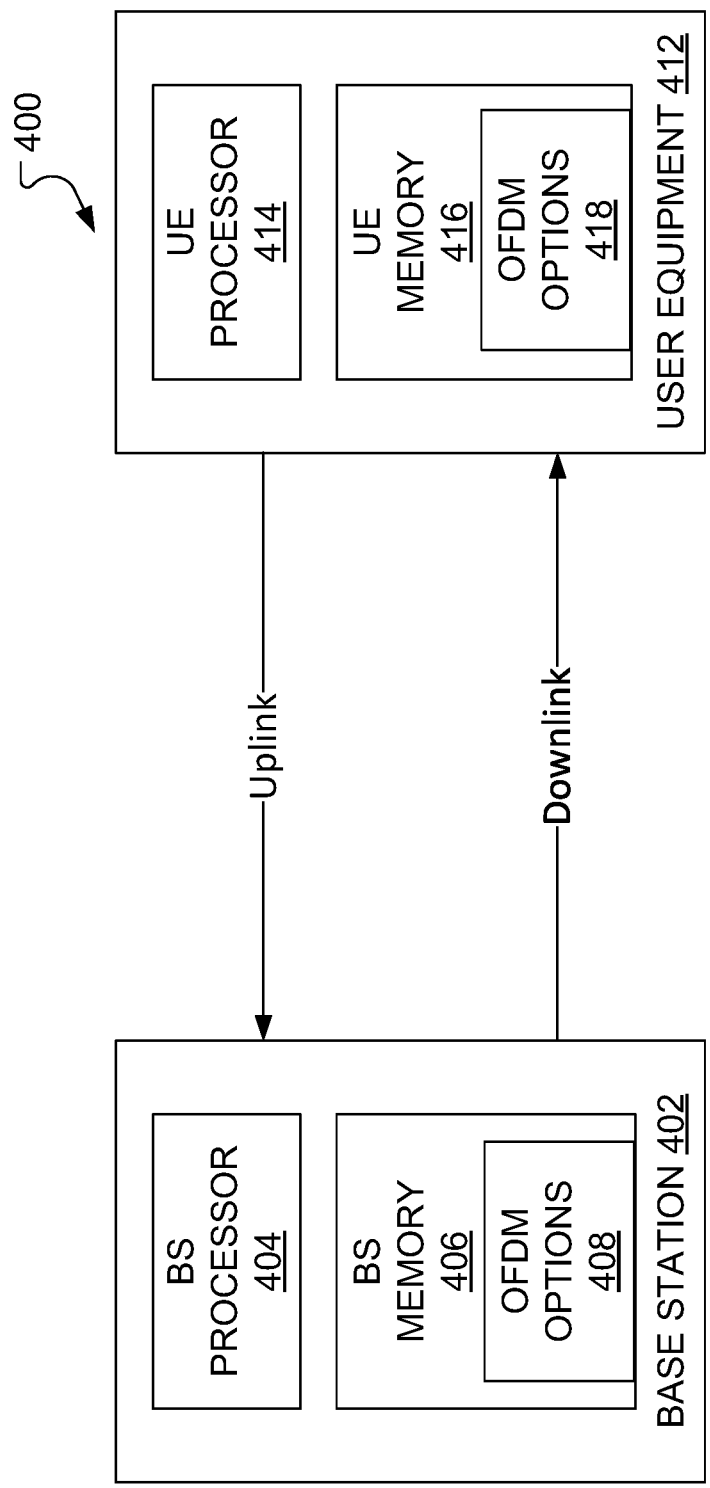
FIG. 4 illustrates a system, including a base station and a user equipment, in which aspects of the present application may find use.

The above description and tables set out a number of possible OFDM numerology parameter sets that can be applied in a communications system that supports multiple OFDM numerologies. Example applications will now be described. FIG. 4 illustrates a system 400 in which aspects of the present disclosure may find use. The system 400 includes a base station (BS) 402 and a user equipment (UE) 412. The base station 402 includes a BS processor 404 and a BS memory 406. The BS memory 406 may store instructions allowing the BS processor 404 to act as a transmit point to carry out aspects of the present application. The user equipment 412 includes a UE processor 414 and a UE memory 416. The UE memory 416 may store instructions allowing the UE processor 414 to act as a transmit point to carry out aspects of the present application. In various embodiments in the application, the base station may be an eNodeB, an access point or any device which can provide numerology configuration information to a UE. The UE can be a device performing UE function during the communication with the base station, for example, an IoT (Internet of Things) device.

Figure 5:
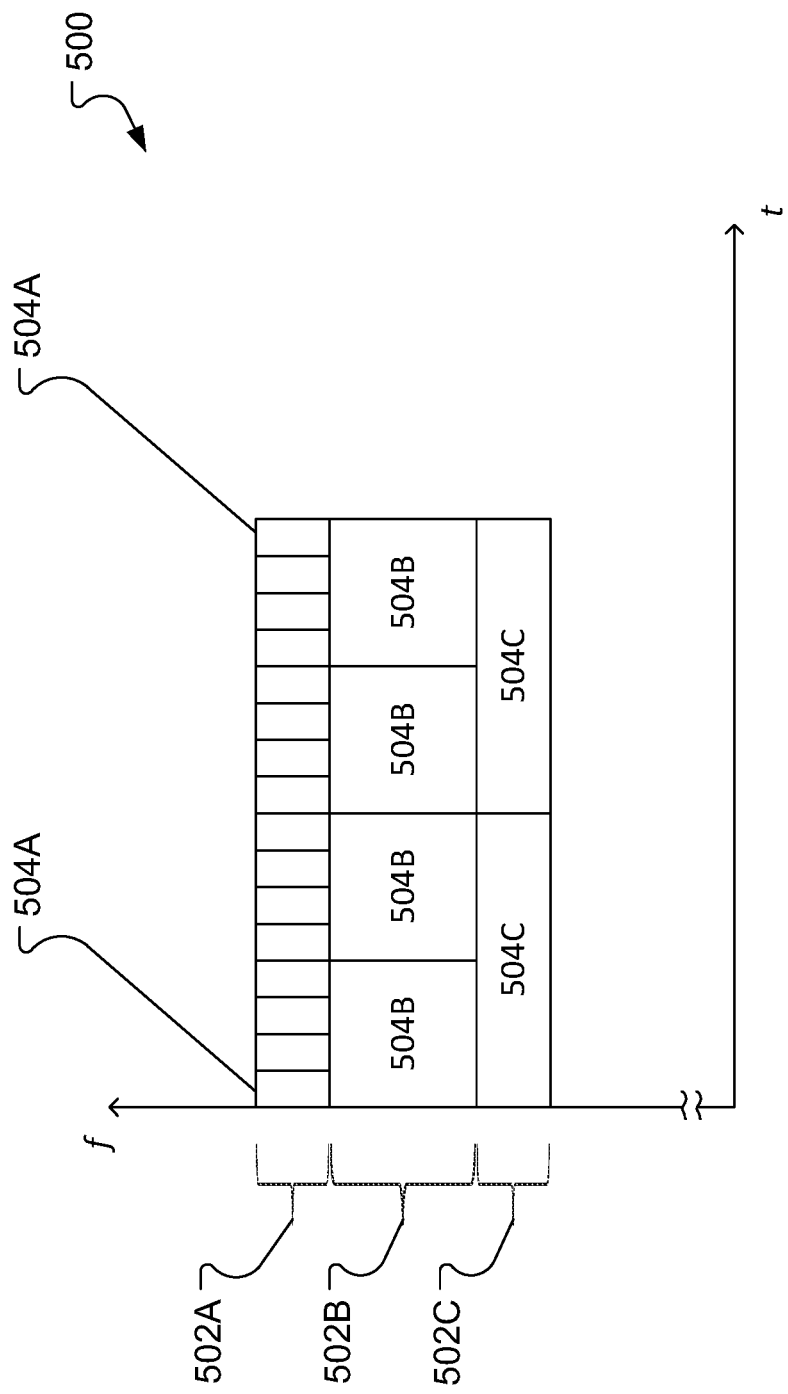
FIG. 5 illustrates an example FDD frame structure, in accordance with aspects of the present application.

The proposed OFDM numerology can be applied to both FDD and TDD radio frames for transmissions with different requirements in a wireless network. In this regard, FIG. 5 illustrates an example FDD frame structure 500 with 20 MHz bandwidth and a first (F-OFDM) sub-band 502A, a second (default OFDM) sub-band 502B and a third (F-OFDM) sub-band 502C (individually or collectively 502). The first sub-band 502A has a subcarrier spacing determined as 60 kHz. The second sub-band 502A has a subcarrier spacing determined as 15 kHz. The third sub-band 502A has a subcarrier spacing determined as 7.5 kHz.

The first sub-band 502A includes first transmission time intervals, the first and last of which are labeled with reference number 504A. The second sub-band 502B includes second transmission time intervals labeled with reference number 504B. The third sub-band 502C includes third transmission time intervals labeled with reference number 504C.

Figure 6:
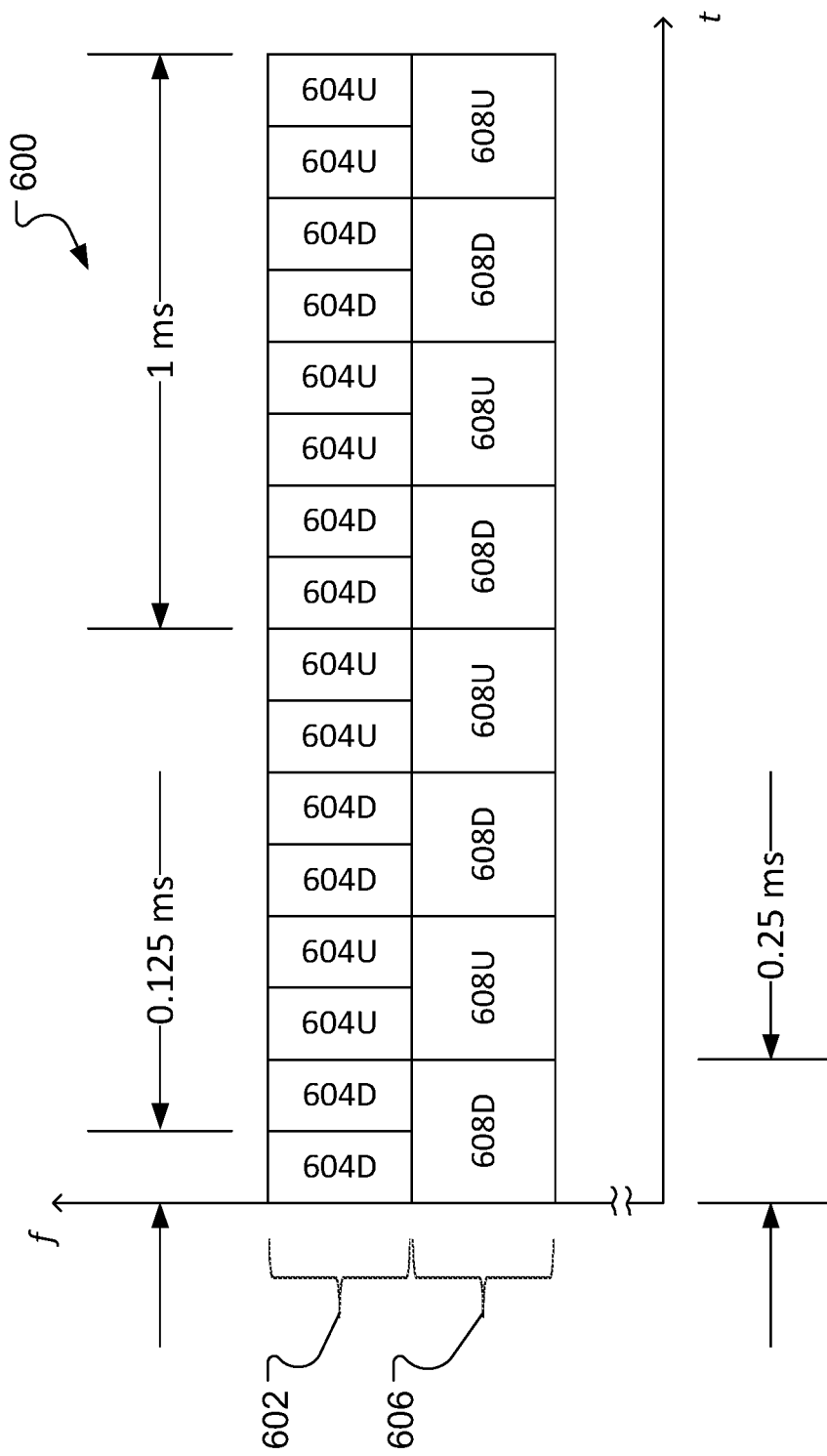
FIG. 6 illustrates an example TDD frame structure, in accordance with aspects of the present application.

FIG. 6 illustrates a TDD frame structure 600 with downlink to uplink ratio (DL:UL) of 4:4. The frame structure 600 of FIG. 6 includes a first sub-band 602 and a second sub-band 606. The first sub-band 602 has a subcarrier spacing determined as 60 kHz and includes first transmission time units labeled with reference number 604. The second sub-band 606 has a subcarrier spacing determined as 30 kHz and includes second transmission time units labeled with reference number 608.

Figure 7:
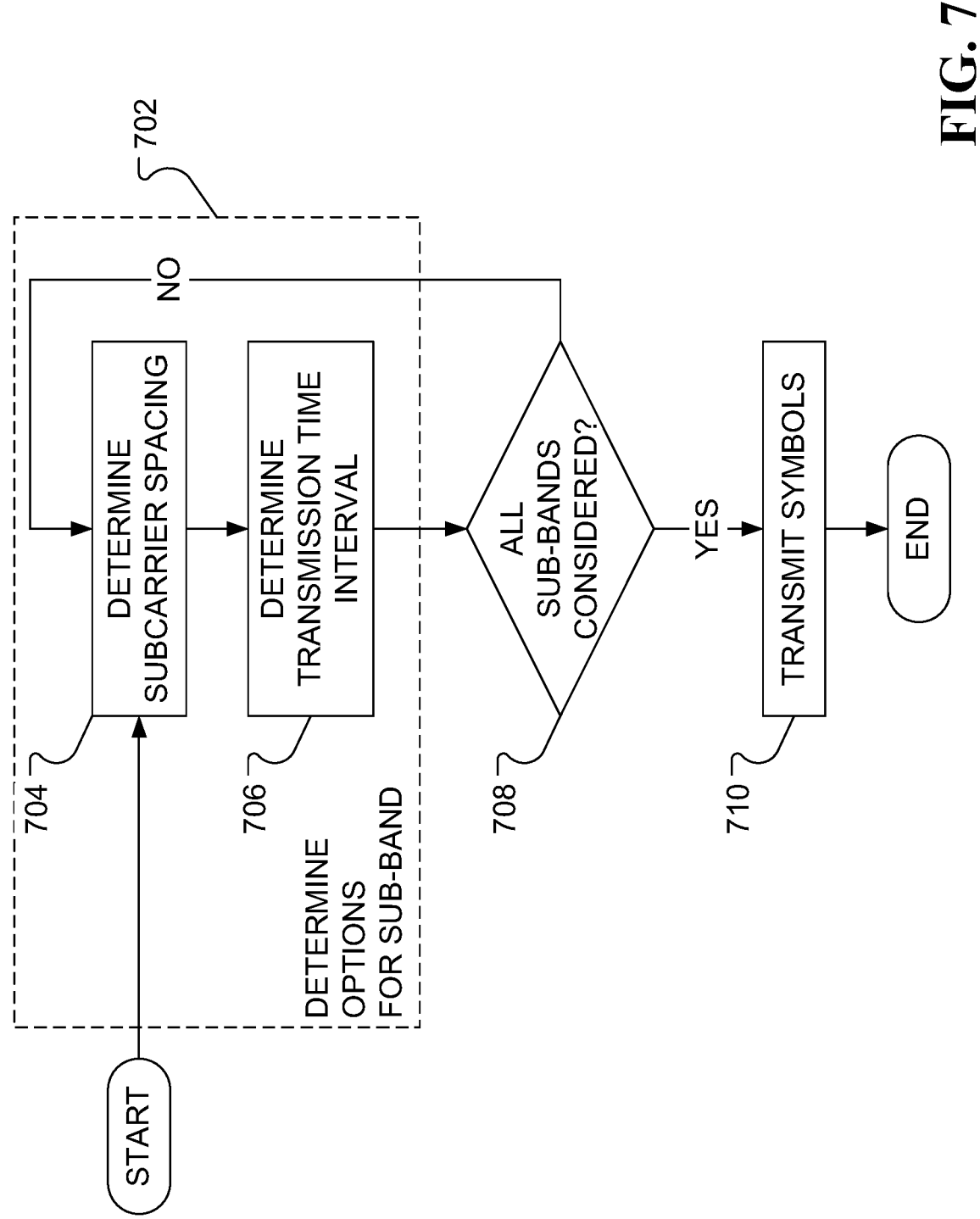
FIG. 7 illustrates example steps in a method for transmitting communications signals using OFDM, in accordance with aspects of the present application.

FIG. 7 illustrates example steps in a method for transmitting communications signals using OFDM. Initially, the UE processor 414 of the UE 412 (see FIG. 4) may determine (step 704), for a first OFDM sub-band, a subcarrier spacing. The UE processor 414 may then determine (step 706) a transmission time interval for the first OFDM sub-band. Notably, the transmission time interval may be determined in a manner that allows for a plurality of OFDM symbols to be included. In the discussion above, example quantities of OFDM symbols included 7, 13, 25 and 35. It is also notable that, among the plurality of OFDM symbols included in a transmission time interval, there may be multiple subsets of OFDM symbols. The subsets may be distinguishable by their respective cyclic prefix duration. As discussed hereinbefore in more detail, the UE processor 414 may apply a cyclic prefix with a first duration to each OFDM symbol of a first subset of the plurality of OFDM symbols and may apply a cyclic prefix with a second duration to each OFDM symbol of a second subset of the plurality of OFDM symbols. OFDM symbols of different durations within a transmission time interval may be ordered into symbol groups in dependence on the frame requirements of the sub-band.

As outlined in the tables above, there a many options, beyond subcarrier spacing and transmission time interval, that may be associated with a particular sub-band. Subcarrier spacing and transmission time interval are but two example options. Other options include FFT size and sampling frequency. Accordingly, determining (step 704) subcarrier spacing and determining (step 706) transmission time interval may be considered to steps within a larger step of determining (step 702) options for a sub-band. While, in some contexts, the term "determining" may correspond to selecting, in the context of the present application, "determining" is most likely to involve the UE processor 414 receiving instructions from the network with which the UE 412 is to communicate.

The network may be considered to be embodied as the base station 402. Both the UE 412 and BS 402 may have access to tables of options similar to selected ones of the tables in the present application. For example, the base station and UE of FIG. 2 each have stored their respective non-transient memory one or more tables, the same as or similar to the tables set out above, defining sets of OFDM parameter options 208, 218. To instruct the UE 412 to employ a particular numerology scheme, the BS 402 may indicate an index to the particular numerology scheme in a table shared by the BS 402 and the UE 412. The UE 412 may be pre-configured with the table or may receive the table in a communication from the BS 402, among other table distribution methods.

In one example embodiment, the UE 412 receives, from the BS 402 on a first frequency sub-band, configuration of a first type of numerology signal, the first type of numerology signal including an indication of a value of a first subcarrier spacing and a value of a first cyclic prefix duration. The UE 412 also receives, from the BS 402 on a second frequency sub-band, configuration of a second type of numerology signal, the second type of numerology signal including an indication of a value of a second subcarrier spacing and a value of a second cyclic prefix duration. The reception of the configuration of the first and second types of numerology signal may occur responsive to the UE 412 transmitting a request to the BS 402. The value of the first subcarrier spacing in the first type of numerology signal has a first scaled relationship to the value of the second subcarrier spacing in the second type of numerology signal, the first scaled relationship involving multiplication by a scaling factor. Furthermore, the value of the first cyclic prefix duration in the first type of numerology signal has a second scaled relationship to the value of the second cyclic prefix duration in the second type of numerology signal, the second scaled relationship involving multiplication by a reciprocal of the scaling factor. In some embodiments, the received configuration information for the first and second types of numerology signals may include the actual parameter values for subcarrier spacing and cyclic preface duration; however, in some embodiments the configuration information includes index values that point to a set of parameter options in a table contained in OFDM options 218. For example, the configuration information for the first numerology signal could point to the column of OFDM parameters in Table 1 associated with 7.5 Khz subcarrier spacing, and the configuration information for the second numerology signal could point to the column of OFDM parameters in Table 1 associated with 15 Khz subcarrier spacing. In some embodiments the configuration information for both types of numerology signals could be received in the same frequency sub-band and include information that identifies the specific sub-band that the configuration information for a numerology signal type is to be applied to.

The UE processor 414 may then determine (step 708) whether all OFDM sub-bands of a plurality of OFDM sub-bands have been considered. Upon determining that further OFDM sub-bands are to be considered, the UE processor 414 returns to determine (step 704), for a second OFDM sub-band, a subcarrier spacing. The UE processor 414 may then determine (step 706) a transmission time interval for the second OFDM sub-band. The UE processor 414 may then determine (step 708) whether all OFDM sub-bands of a plurality of OFDM sub-bands have been considered. Upon determining that all OFDM sub-bands of the plurality of OFDM sub-bands have been considered, the UE processor 414 may then transmit (step 510) the OFDM symbols on the plurality of OFDM sub-bands.

In one aspect of the present application, the sub-carrier spacing determined (step 704) for one of the OFDM sub-bands is 15 kHz, thereby accommodating backwards compatibility with LTE.

In one aspect of the present application, when determining (step 702) options for a given sub-band, the UE processor 414 may apply, to a given sub-band, a maximum sampling frequency that exceeds 30.72 MHz.

In one aspect of the present application, when determining (step 706) transmission time interval, the UE processor 414 may concatenate multiple transmission time interval components into a single transmission time interval.

Figure 8:
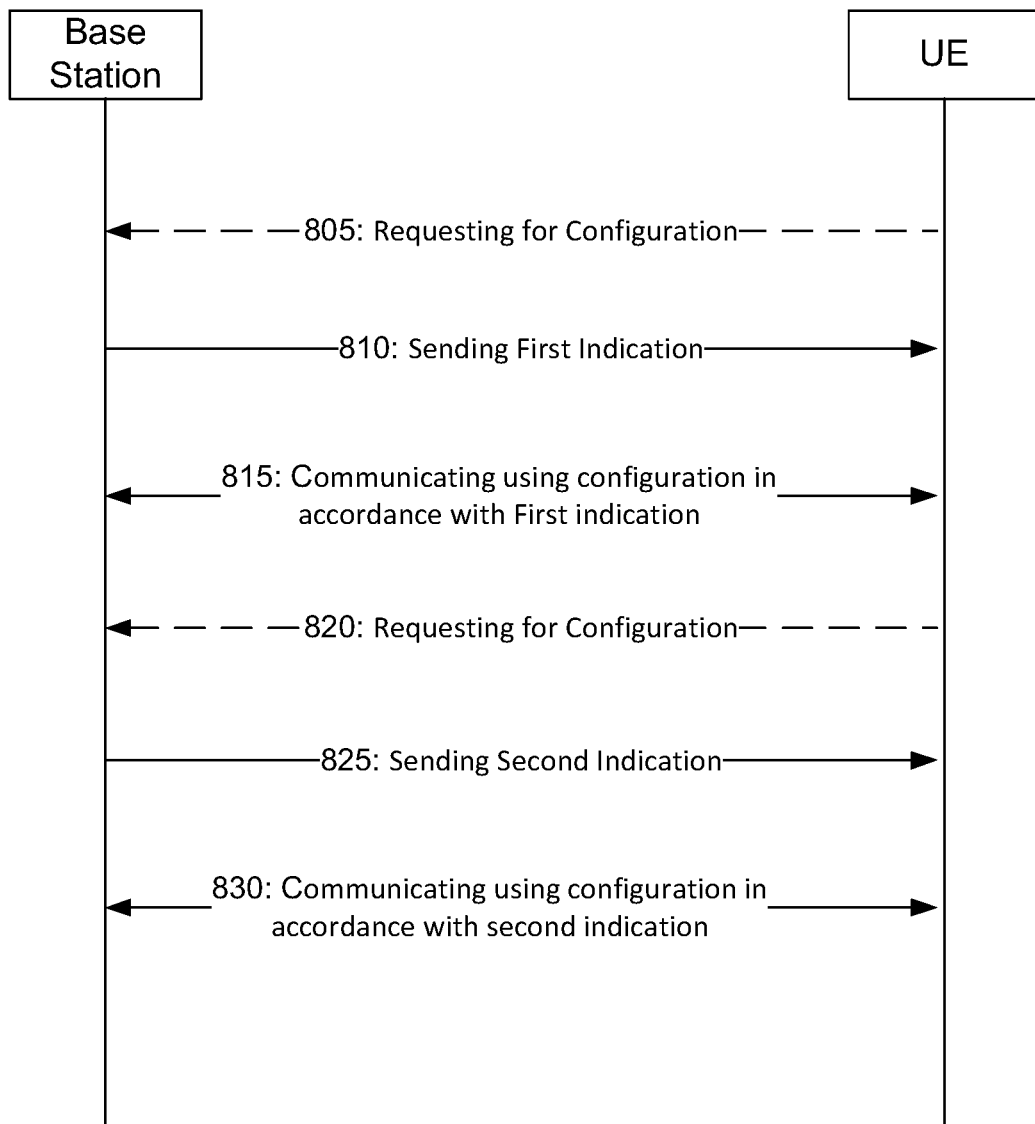
FIG. 8 illustrates an example steps in a method for communicating signals using OFDM where the numerology configuration may be dynamically configured, in accordance with aspects of the present application.

In the example of FIG. 8, UE sends a request (805) for a numerology configuration to a base station and base station sends (810) a first indication. As illustrated in the FIG. 8 and other figures as well, the action, like sending request (805), is shown as dashed, which means this action is optional in some embodiments. The indication may indicate a set of numerology configuration. In an embodiment, both UE and base station may have stored a pool of numerology configurations, like a configuration table as Table 1, in advance. In some embodiments, in a pool of numerology configurations, the scalable numerology configuration may include at least three sets of numerology parameters. It is possible that base station and UE may store different numbers of configuration sets. In other words, UE may only store a subset of the configuration pool that base station has. Referring to table 1 for example, base station may store the complete Table 1. UE may only store a sub group of the all sets, like only the set of 7.5 kHz subcarrier spacing (the column of 7.5 kHz subcarrier spacing in Table 1) and the set of 15 kHz subcarrier spacing, or only store the configuration for some of the numerology parameters, like subcarrier spacing and TTI, or even only store configuration for some of the numerology parameters for some parameter sets. For some devices like IoT (Internet of things) machine devices, the UE may only pre-store information for one set or a part of one set of parameter configurations. In other embodiment, base station and/or UE may store a mapping relationship between different sets of numerology parameters and/or a mapping relationship between different parameters in a same parameter set. The mapping relationship can be in a form of equations. The indication that base station sends out may be an index to a certain column of the table, i.e., an index of a set of numerology parameters, or indication of a value of a numerology parameter in one set of numerology parameters.

In various embodiments, the requesting action (805) from UE may not happen as base station may send the indication to UE on its own based on the channel quality, traffic, and/or service requirement situation. When UE initializes with the network, the base station may also send out the indication without being requested. When UE receives the indication, UE is able to lookup the pre-stored configuration table with the indication to obtain the numerology configuration indicated by the indication. In some embodiment, UE may need to use the indication to obtain the numerology configuration. For example, the indication may indicate a value of a certain numerology parameter or a parameter related to a certain numerology parameter. UE can calculate the needed numerology parameters in accordance with a pre-stored configuration table or a pre-defined mapping relationship.

When UE obtains the required numerology configurations for a communication, UE/Base station communications start (815) with base station using the configuration in accordance with the first indication. In some situations, which may occur due to different events (or detected conditions), like changes of service, channel quality and/or traffic, UE may optionally request (820) for another configuration. Base station sends (825) a second indication. After UE obtains the required second set of configuration parameters, UE/Base station communication then starts (830) using the configuration in accordance with the second indication.

Figure 9:
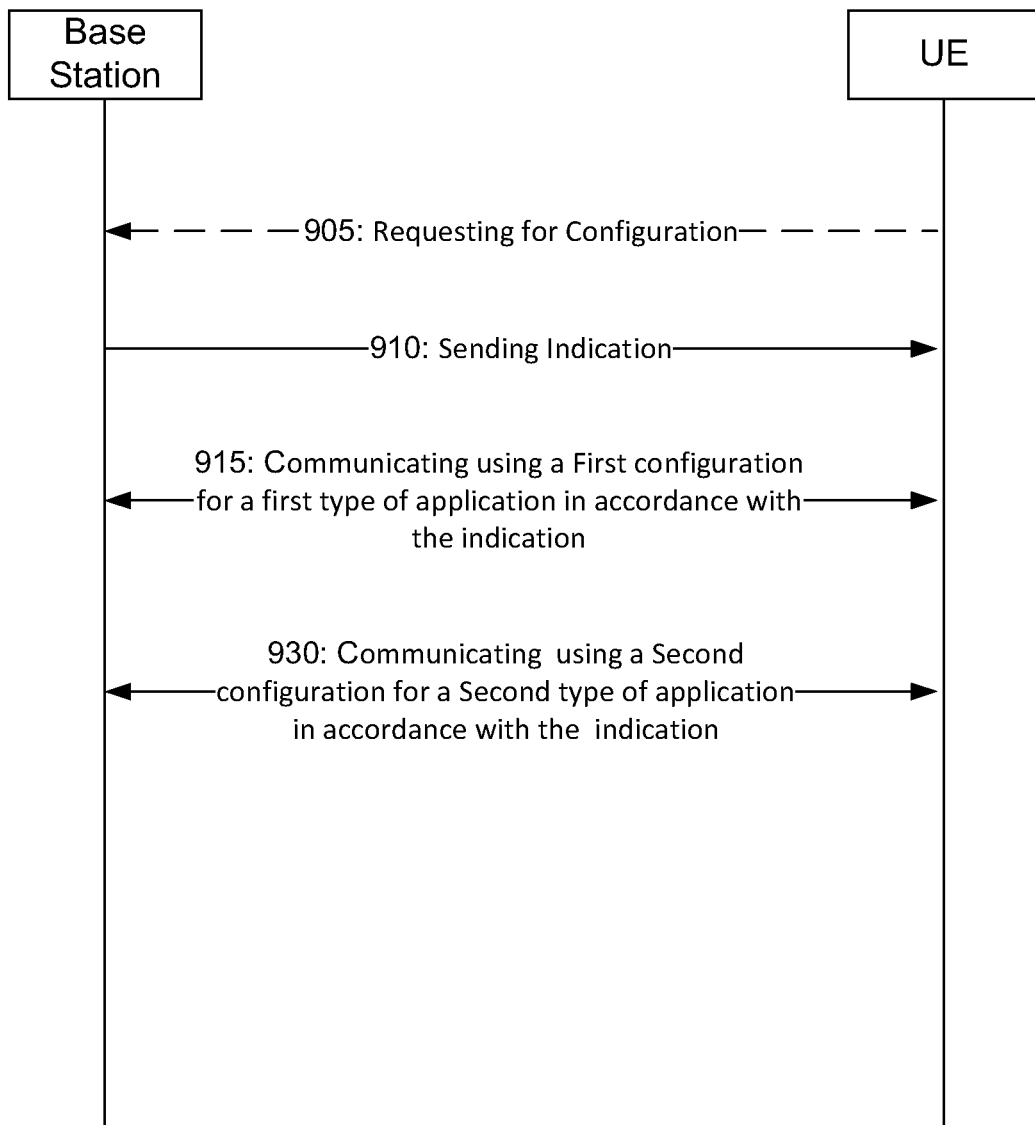
FIG. 9 illustrates an example steps in a method for communicating signals using OFDM where UE may use different numerology configuration for different types of communication/traffic, in accordance with aspects of the present application.

FIG. 9 is a call flow diagram illustrating an interaction between a mobile device, such as a UE, and a network access point, such as a base station. As discussed above, different types of communication may call for different numerology configurations. In previously presented examples the discussion centered on changing needs for a UE. In some embodiments, a UE may execute a plurality of different applications or different types of traffic. Some of these applications or traffic will connect to the network using different numerologies. For example, a UE may be used by a user for an MBB connection, while an application resident on the UE may be acting as an IoT gateway. These two different applications have different network usage profiles, and can best be served by different types of connections. For example, the MBB connection may be given a wider sub-carrier spacing than the connection that serves the IoT gateway.

In step 905, the UE transmits a request to the network to configure a numerology for a connection. This optional step may identify a plurality of different connection types, or it may be executed only after an application is initiated. In step 910, the base station transmits an indication to the UE containing an identification of different numerology configurations for different application type/traffic types. As noted in other examples, this indication could be an explicit recitation of the numerology configuration parameters, or it could be a simplified indication such as a table index that can be used by the UE to determine the configuration parameters.

The UE can use the received indication to configure itself for communication with the base station. Communication with the base station using a first numerology configuration is carried out in step 915. This may be application specific communication, or it can be a default communication profile. In step 930, communication using a second configuration associated with a different application type is carried out. It should be noted that 915 and 930 can happen in various orders and may happen contemporaneously.

In one embodiment, a UE will connect to the base station and be assigned a first numerology configuration. After an application is launched on the UE, or after the UE begins providing a service, the UE will inform the network that there will be traffic flows that may be better served by a different numerology. Informing the network can be understood to be a part of the request message sent as step 905. Because the UE will have different traffic flows with different characteristics, the network can determine that the UE should use two different numerologies for the two different traffic flows. The indication sent in 910 can notify the UE of a numerology that is to be used for the second traffic flow, while the first traffic flow uses the initial numerology configuration. As the UE continues to operate, the two different traffic flows are communicated using the two different numerologies in steps 915 and 930. This allows a network to provide the UE with a connection profile for each traffic flow that specifically addresses the needs of the traffic flow in the network.

Figure 10:
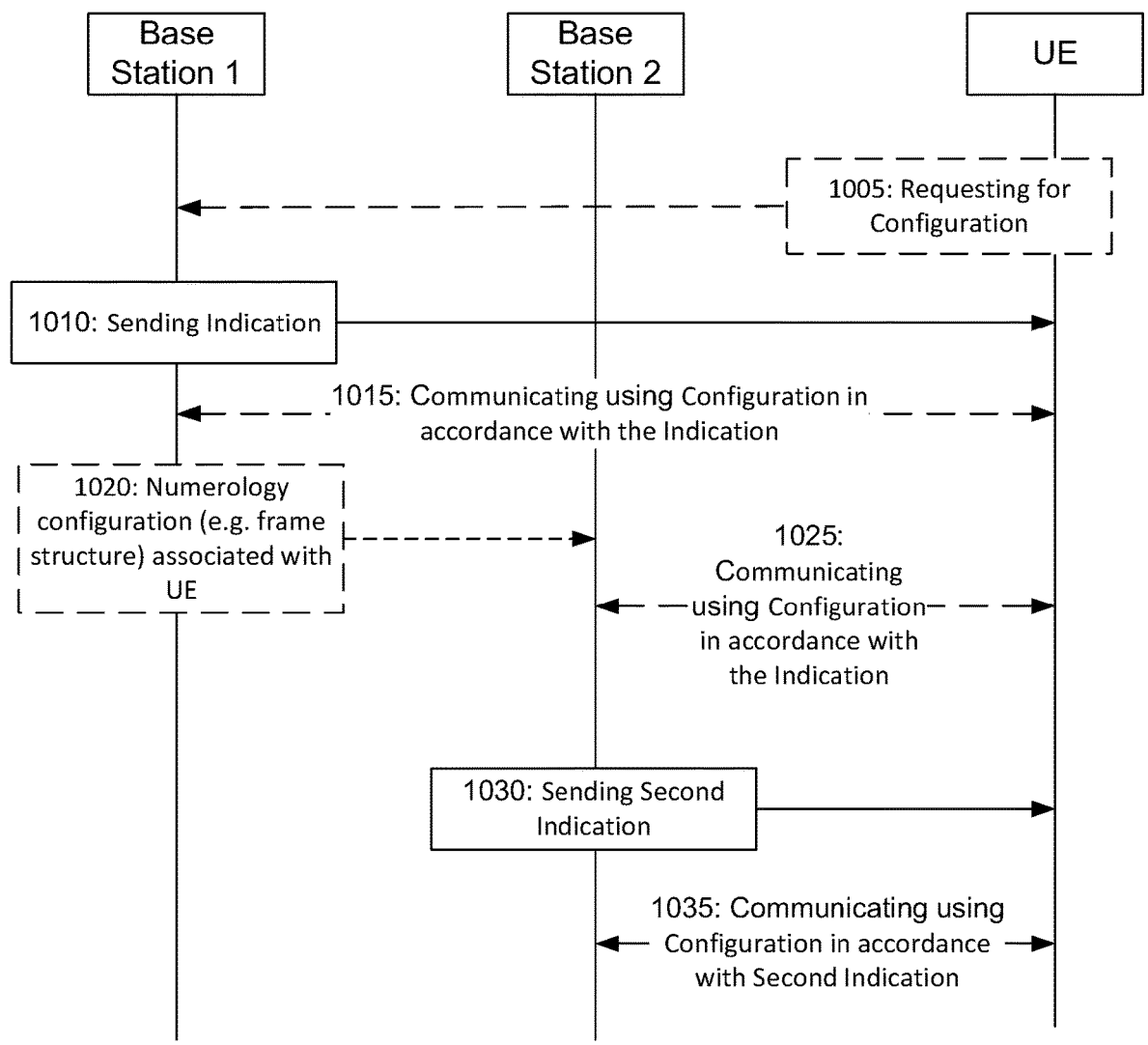
FIG. 10 illustrates an example steps in a method for communicating signals using OFDM where UE may use same numerology configuration for different base station, in accordance with aspects of the present application.

FIG. 10 is a call flow diagram illustrating a signaling interaction between a UE and different base stations. As will be understood, the design of a mobile network must take into account mobility of the UE. In optional step 1005, the UE requests a numerology configuration for communication with base station 1. In step 1010, base station 1 sends an indication of the assigned numerology to the UE and in 1015 the UE and base station 1 communicate with each other in accordance with the assigned numerology. When UE needs to communicate with base station 2, for example, the UE moves. The network may forecast that it will be moving to an area that is served by base station 2. The numerology configuration associated with the UE is provided to the second base station in 1020. The numerology may be provided as an explicit recitation of the parameters, or it may be provided in other forms including as an index indicating an entry in a table, or as a subset of the parameters that would then allow base station 2 to determine the full set of parameters. This message may be transmitted from base station 1 or from another entity in the network. By being provided an indication of the numerology parameters associated with the UE, base station 2 is able to provide support for a seamless transition in the communication with the UE as shown in 1025.

In some embodiments, there can be different events (or detected conditions) that may result in the network wanting to change the numerology assigned to the UE. In some situations, being served by a different base station may be one of these events, and detecting a change in UE speed (in the case of a mobile UE) may be one of the detected conditions. After being continuing to communicate with base station 2, as shown in 1025, the UE may increase its speed. This can be detected by the network, and in 1030, base station 2 can transmit an indication of a new numerology assignment. Upon receipt of the assigned, the UE can configure itself for the new numerology parameters, and then resume communicating with base station 2 in accordance with the numerology parameters associated with the second indication, as shown in 1035.

Figure 11:
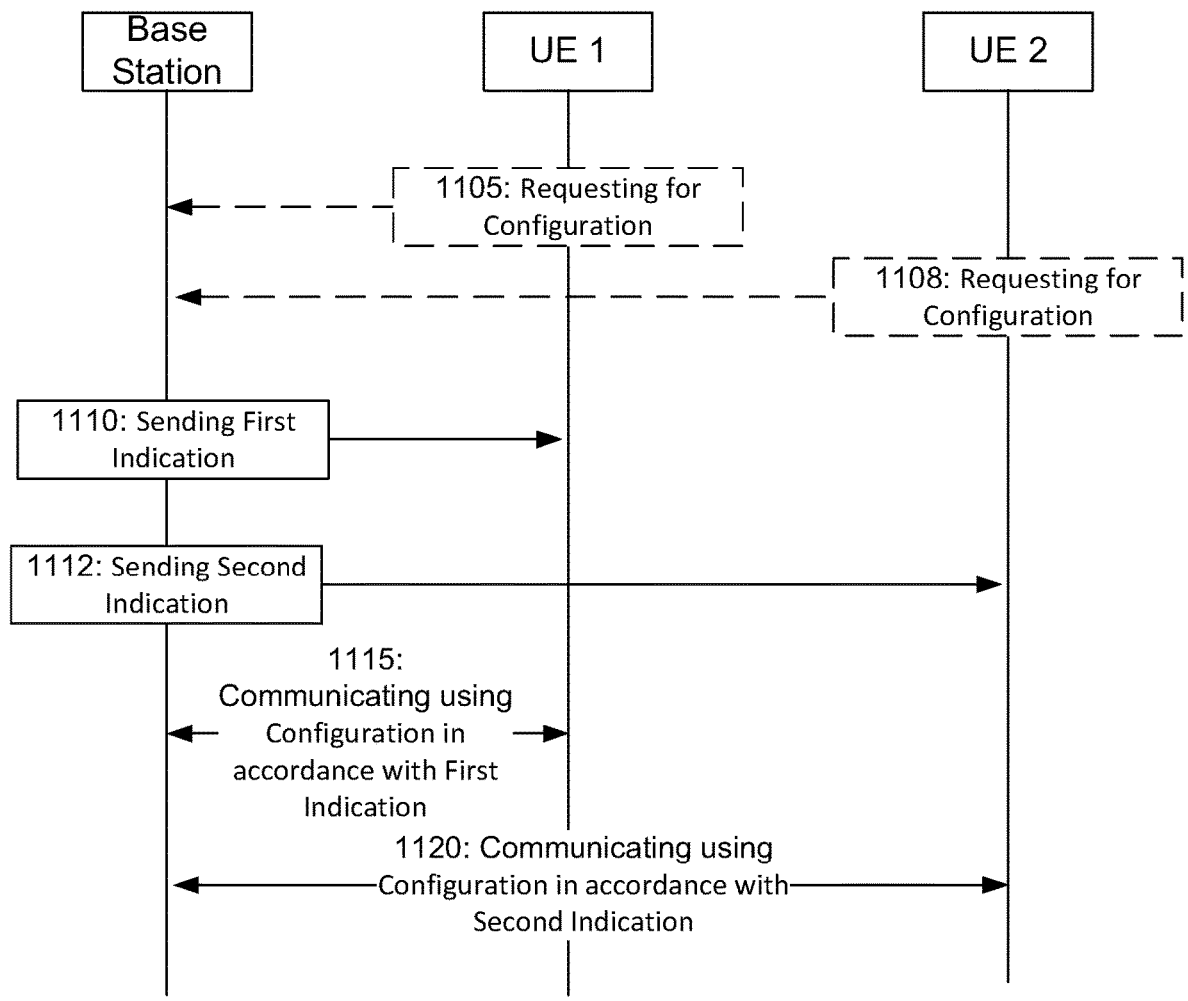
FIG. 11 illustrates an example steps in a method for communicating signals using OFDM where base station may support more than one numerology configuration for different UE in different sub-band of a same frequency band, in accordance with aspects of the present application.

FIG. 11 illustrates an example steps in a method for communicating signals using OFDM where a base station may support more than one numerology configuration for different UEs in different sub-bands of a same frequency band, in accordance with aspects of the present application. In optional step 1105, a first UE 1 requests a numerology configuration for communications with a base station, and in optional step 1108, a second UE 2 requests a numerology configuration for communications the same base station. In step 1110, the base station sends an indication of the assigned numerology to the first UE 1, and in step 1112, the base station sends an indication of assigned numerology to the second UE 2. In an example embodiments the assigned numerology for UE 1 is for use in a different sub-band that the assigned numerology for UE 2 and the respectively assigned numerologies can include different OFDM parameter sets such that UE 1 and UE 2 will each communicate with the base station in a respective sub-band using a respective OFDM numerology parameter set, as indicated in steps 1115 and 1120.

Figure 12:
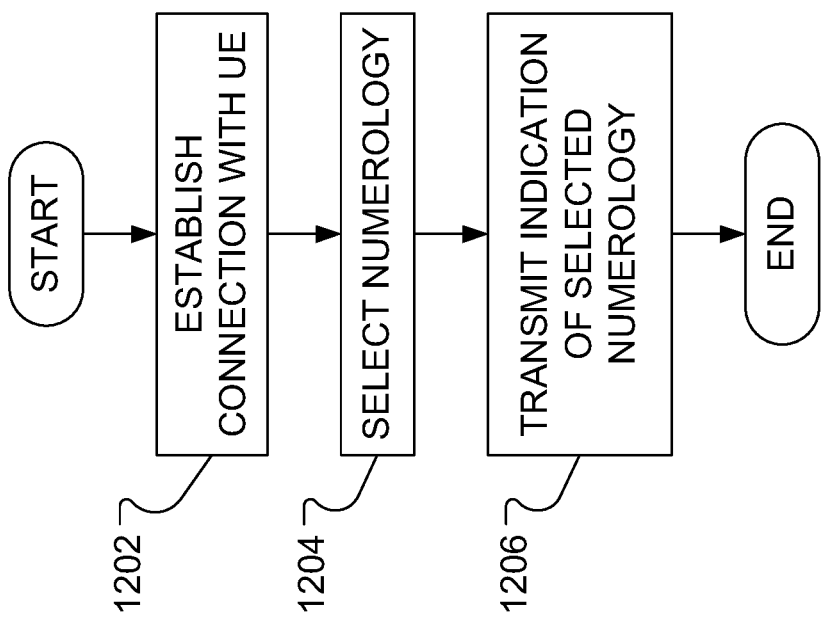
FIG. 12 illustrates example steps in a method for configuring communications with a communication device in accordance with aspects of the present application.

In the example of FIG. 12, in operation, upon establishing (step 1202) an initial connection with the UE 412, the BS processor 404 may select (step 1204) a particular numerology for use for further communication with the UE 412. The BS processor 404 may base the selecting on various requirements associated with an application to be executed at the UE 412 and that will use the desired connection between the BS 402 and UE 412. The UE 412 may communicate one or more requirements to the BS 402 as part of the initial establishment of the connection. One such requirement may be a latency threshold. Another such requirement may be a predetermined ratio of control traffic to data traffic associated with the desired connection between the BS 402 and UE 412. Further requirements may relate to TDD configurations and sub-band co-existence.

Selecting (step 1204) a particular numerology, in view of the preceding, may involve determining a base subcarrier spacing and CP overhead. Indeed, a base subcarrier spacing and CP overhead may already be established for communication between the BS 402 and the UE 402 such that the determining may involve simply reading a memory location. The BS processor 404 may select a new subcarrier spacing that is an integer multiple of the base subcarrier spacing. The BS processor 404 may then select a new CP length for the new subcarrier spacing, where the new CP length maintains the established CP overhead.

Once the BS processor 404 has selected (step 1204) a particular numerology, the BS processor 404 may transmit (step 1206) an indication of the selected numerology to the UE 412. As mentioned hereinbefore, the BS processor 404 may indicate an index to the particular numerology scheme in a table shared by the BS 402 and the UE 412.

In the example embodiment discussed hereinbefore, the BS 402 transmits, to the UE 412 on a first frequency sub-band, configuration of a first type of numerology signal, the first type of numerology signal including an indication of a value of a first subcarrier spacing and a value of a first cyclic prefix duration. The BS 402 also transmits, to the UE 412 on a second frequency sub-band, configuration of a second type of numerology signal, the second type of numerology signal including an indication of a value of a second subcarrier spacing and a value of a second cyclic prefix duration. The transmission of the configuration of the first and second types of numerology signal may occur responsive to receipt, by the BS 402 and from the UE 412, of a request. The value of the first subcarrier spacing in the first type of numerology signal has a first scaled relationship to the value of the second subcarrier spacing in the second type of numerology signal, the first scaled relationship involving multiplication by a scaling factor. Furthermore, the value of the first cyclic prefix duration in the first type of numerology signal has a second scaled relationship to the value of the second cyclic prefix duration in the second type of numerology signal, the second scaled relationship involving multiplication by a reciprocal of the scaling factor.

In one aspect of the present application, a method for configuring communications, with a communication device, using orthogonal frequency division multiplexing (OFDM), the method includes receiving data in accordance with a first set of numerology configuration on a first frequency sub-band and receiving data in accordance with a second set of numerology configuration on a second frequency sub-band. The numerology configuration includes transmission time interval (TTI) length and subcarrier spacing duration. Both the TTI length and subcarrier spacing duration in the two sets of numerology configuration are in scalable relationship. The TTI length and subcarrier spacing duration are in reciprocal proportional scalable relationship. The number of symbols per TTI is given fixed for the two sets of numerology configurations.

Figure 13:
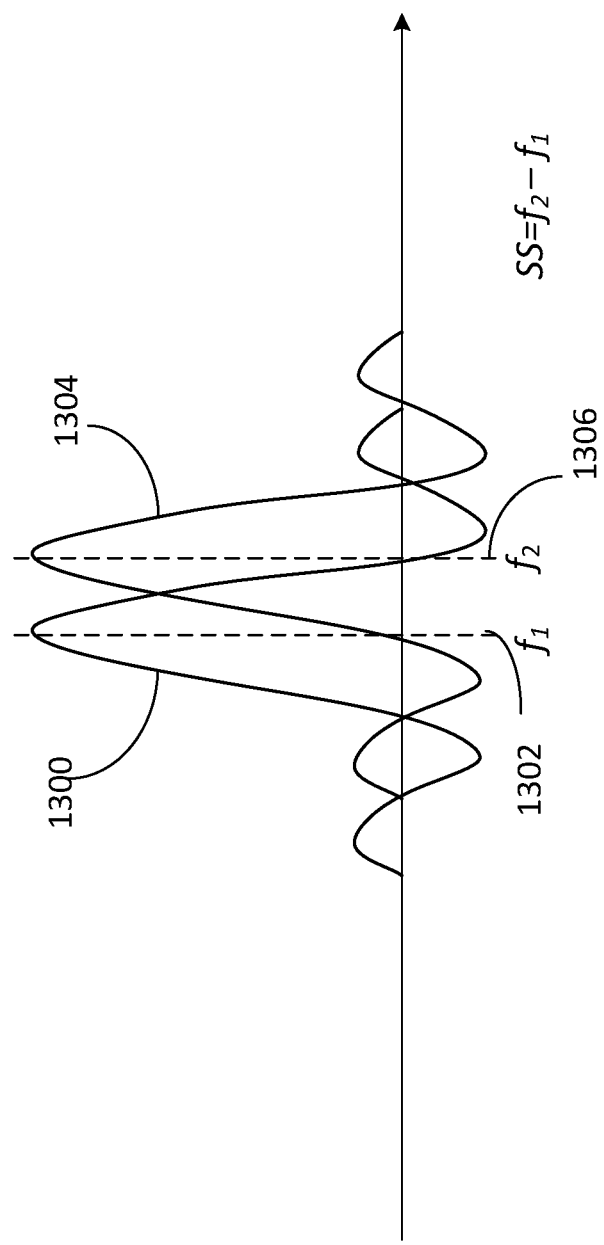
FIG. 13 is an illustration of OFDM waveforms and sub carrier spacing.

OFDM waveforms are used in many transmission system and have many known properties. An OFDM waveform can be modeled as a sinc function, as shown in FIG. 13. A first waveform 1300 in a first subcarrier is shown adjacent to a second waveform 1304 in a second subcarrier. To avoid interference between adjacent sub carriers, the center frequency $f_1$ 1302 of waveform 1300 is offset from the center frequency $f_2$ 1306 of waveform 1302, so that the peak of one waveform coincides with a null in the adjacent waveform. The distance between adjacent frequencies is referred to as the subcarrier spacing. In the illustrated example, the sub-carrier spacing is $|f_1 - f_2|$. The subcarrier spacing is one of a plurality of parameters that defines the transmission numerology. Other such parameters include the length of the CP, the size of the OFDM symbol and the length of a TTI.

The size of an OFDM symbol is a function of both the subcarrier spacing and the length of the CP. The length (or duration in time) of a TTI can be defined as a function of the number of OFDM symbols transmitted in a single TTI.

In conventional networks, such as LTE networks, the numerology parameters are relatively fixed. This allows for a simplified implementation of transmitters and receivers, and may reduce the complexity of an attach procedure. The parameters, such as the subcarrier spacing in an LTE network were selected based on an attempt to satisfy issues of the most common use case scenarios. In LTE, two subcarrier spacings (15 kHz and 7.5 kHz) were defined to allow networks to serve two specific scenarios. A deployment of relatively stationary devices with low bandwidth requirements (such as Machine Type Communication (MTC) devices, alternatively referred to as an Internet of Things (IoT) deployment) may be served with a narrower subcarrier spacing to suit the low bandwidth and the larger number of devices. Support for more mobile devices that require mobile broadband (MBB) connections could be served using 15 kHz subcarrier spacings. In both numerologies, a fixed TTI of 1 ms is defined. The number of symbols carried in each of the two numerologies differs so that the TTI length is preserved.

In future networks, the ability the sue a wider range of transmission frequencies poses a problem with current LTE numerologies which were selected based on properties of channels associated with a limited range of supported frequencies and expectations on mobility. To increase the capacity in the network and to provide support for different mobility scenarios, a more flexible approach to waveform numerology is called for.

Based on the mobility characteristics of the mobile device (e.g. UE) and the center frequency of the subcarrier, a variable subcarrier spacing may be beneficial. A low (or no) mobility device which is expected to need low bandwidth connections, may be sufficiently supported by a narrow subcarrier spacing. Devices with higher velocity and operating in a higher frequency band (e.g. 6 GHz) may experience degraded performance with a 15 kHz subcarrier spacing due to a variety of factors including Doppler induced frequency shifts as seen by the receiver. UEs moving in different directions with different speeds will be subject to different Doppler induced frequency shifts as seen by the receiver, which may result in interference between adjacent subcarriers.

To address these issues, a network entity may, assign both a center frequency and a subcarrier spacing to a device. This assignment may be done during the device attach procedure or at other times based on a change in needs of the device. In one embodiment, the network can support both a variable subcarrier spacing and a variable CP length, while in other embodiments the CP length is fixed. Varying either the subcarrier spacing or the CP length will change the length of an OFDM symbol.

The length of a TTI can be fixed in duration (e.g. the fixed TTI length of 1 ms in LTE) or it can be fixed in the number of OFDM symbols that can be carried in an TTI. To preserve both a fixed duration of a TTI and a fixed number of OFDM symbols per TTI, the CP length would need to be adjusted along with the subcarrier spacing. In some scenarios this may result in a CP that is insufficiently long to provide protection from inter-symbol interference, while in other scenarios it would reduce the efficiency of the numerology. It should also be noted that there is a minimum length for a CP, so the ability to control the length of an OFDM symbol by adjusting the length of a CP is limited.

By allowing the length of the OFDM symbol to vary, a network can either fix a CP length or allow for a CP length to be selected that provides a desired efficiency and required degree of protection.

Maintaining a fixed TTI duration across a wide number of subcarrier spacings and across a wide frequency range necessitate having the number of symbols in each TTI to vary with the changing subcarrier spacing. This may be acceptable if the network access node supports a limited number of numerologies that are designed in conjunction with each other. An Access Node that only supports stations devices such as MTC devices could co-exist with an Access Node supporting highly mobile MBB devices in the same network. However, an Access Node tasked with serving different connection types would either be very limited in the ability to support different numerologies, or it would need to support different channel architectures if a fixed duration TTI will contain different numbers of OFDM symbols for the different types of connections.

To allow variable OFDM symbol length, which as noted above is a consequence of variable subcarrier spacing with useful CP lengths, the time duration of a TTI can be allowed to vary for different numerology configurations. The variable TTI duration can allow for a fixed number of OFDM symbols per TTI across all numerologies supported by the network access node.

Thus, a method for supporting a flexible numerology can be provided that allows for a flexible subcarrier spacing with either fixed or variable CP lengths. The duration of the TTI also varies in accordance with the OFDM symbol length (as the number of symbols/TTI is fixed). By selecting the number of symbols/TTI, a network can co-exist safely with an LTE network. In one such example a TTI can be defined to hold 7 OFDM symbols (divided between the data and the CP).

The network can select the numerology to be used by a UE in accordance with a number of factors. The type of the UE, the type of the connection required, the frequency at which the connection will be made, the expected speed of the UE and other such factors can be used to select a subcarrier spacing. In some embodiments, these factors may also be used to select a CP length. Based on the SCS and the CP length, an OFDM symbol size can be defined, and based on the number of symbols/TTI supported by the network, the TTI duration is set.

The network can then instruct a UE to use the selected numerology. In some embodiments, the UE may explicitly inform the network that it can only support a limited number of numerology configurations. This may include the UE transmitting an identification of the numerologies that it can support. In such a scenario, the network entity will select a numerology that is supported by the UE.

Some networks, and some UEs, may support a predefined set of numerologies, while others may support a much larger variation of subcarrier spacings (and CP lengths). If there is a limited number of supported numerologies, they can be stored in a table and referred to by an index value. Otherwise, a sufficient number of parameters can be used to identify the numerology. For example, if the network requires a fixed CP length, and the number of symbols/TTI is defined, it may be possible to identify the numerology with only the subcarrier spacing. Where a variable CP length is supported, it may be possible to identify a numerology with a subcarrier spacing and CP pair. When the CP length is fixed, it may also be possible to identify a numerology with a TTI length, as the fixed number of symbols in a TTI would allow for an identification of an OFDM symbol length, which given the fixed CP may allow for an identification of the subcarrier spacing.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

What is claimed is:

1. A method comprising:
receiving, by a user equipment (UE), an indication of a first subcarrier spacing; and
transmitting or receiving, by the UE, an orthogonal frequency division multiplexing (OFDM) signal according to the first subcarrier spacing associated with a first transmission time unit (TTU),
wherein the first TTU comprises a fixed additional cyclic prefix (CP) duration and a first number of consecutive scalable symbol durations of the first subcarrier spacing, each scalable symbol duration of the first subcarrier spacing having a same time length and each comprising a first cyclic prefix (CP) part and a first useful OFDM signal part,
wherein the first subcarrier spacing is a $2^n$ multiple of a base subcarrier spacing, where n is a non-zero integer and the base subcarrier spacing is associated with a second TTU, the second TTU having a same time length as the first TTU and the second TTU comprising the fixed additional CP duration and a second number of consecutive scalable symbol durations of the base subcarrier spacing, each scalable symbol duration of the base subcarrier spacing having a same time length and each comprising a second CP part and a second useful OFDM signal part, wherein a time length of the second CP part is the $2^n$ multiple of a time length of the first CP part and a time length of the second useful OFDM signal part is the $2^n$ multiple of a time length of the first useful OFDM signal part.

2. The method of claim 1, wherein the base subcarrier spacing is 15 kHz and is associated with a long CP duration and a short CP duration, where a time length of the fixed additional CP duration is the difference between the long CP duration and the short CP duration.

3. The method of claim 1, wherein the first subcarrier spacing is 15 kHz and is associated with a long CP duration and a short CP duration, where a time length of the fixed additional CP duration is the difference between the long CP duration and the short CP duration.

4. The method of claim 1, wherein the first TTU comprises a starting symbol duration of the first subcarrier spacing, the starting symbol duration of the first subcarrier spacing comprising the fixed additional CP duration and a first scalable symbol duration of the first number of consecutive scalable symbol durations of the first subcarrier spacing, wherein the second TTU comprises a starting symbol duration of the base subcarrier spacing, the starting symbol duration of the base subcarrier spacing comprising the fixed additional CP duration and a second scalable symbol duration of the second number of consecutive scalable symbol durations of the base subcarrier spacing, and wherein the starting symbol duration of the first subcarrier spacing is not scaled with the starting symbol duration of the base subcarrier spacing.

5. The method of claim 1, wherein the fixed additional CP duration is equal to a time length of 16 samples based on a sampling frequency of 30.72 MHz.

6. The method of claim 1, wherein the fixed additional CP duration is at the start of the first TTU and at the start of the second TTU, and the start of the first TTU and the start of the second TTU are aligned in time domain, and the end of the first TTU and the end of the second TTU are aligned in the time domain.

7. The method of claim 6, wherein a first frequency sub-band is associated with the first TTU and a second frequency sub-band is associated with the second TTU.

8. The method of claim 1, wherein the first subcarrier spacing is 30 kHz, a time length of the first TTU is 0.5 ms, and the first TTU comprises the fixed additional CP duration and fourteen consecutive scalable symbol durations of the first subcarrier spacing.

9. The method of claim 1, wherein the first subcarrier spacing is 60 kHz, a time length of the first TTU is 0.5 ms, and the first TTU comprises the fixed additional CP duration and twenty-eight consecutive scalable symbol durations of the first subcarrier spacing.

10. The method of claim 1, wherein the base subcarrier spacing is 15 kHz, a time length of the second TTU is 0.5 ms, and the second TTU comprises the fixed additional CP duration and seven consecutive scalable symbol durations of the base subcarrier spacing.

11. A user equipment comprising:
a memory storing instructions; and
a processor configured, by the instructions, to:
receive an indication of a first subcarrier spacing; and
transmit or receiving an orthogonal frequency division multiplexing (OFDM) signal according to the first subcarrier spacing associated with a first transmission time unit (TTU),
wherein the first TTU comprises a fixed additional cyclic prefix (CP) duration and a first number of consecutive scalable symbol durations of the first subcarrier spacing, each scalable symbol duration of the first subcarrier spacing having a same time length and each comprising a first cyclic prefix (CP) part and a first useful OFDM signal part,
wherein the first subcarrier spacing is a $2^n$ multiple of a base subcarrier spacing, where n is a non-zero integer and the base subcarrier spacing is associated with a second TTU, the second TTU having a same time length as the first TTU and the second TTU comprising the fixed additional CP duration and a second number of consecutive scalable symbol durations of the base subcarrier spacing, each scalable symbol duration of the base subcarrier spacing having a same time length and each comprising a second CP part and a second useful OFDM signal part,
wherein a time length of the second CP part is the $2^n$ multiple of a time length of the first CP part and a time length of the second useful OFDM signal part is the $2^n$ multiple of a time length of the first useful OFDM signal part.

12. The user equipment of claim 11, wherein the base subcarrier spacing is 15 kHz and is associated with a long CP duration and a short CP duration, where a time length of the fixed additional CP duration is the difference between the long CP duration and the short CP duration.

13. The user equipment of claim 11, wherein the first subcarrier spacing is 15 kHz and is associated with a long CP duration and a short CP duration, where a time length of the fixed additional CP duration is the difference between the long CP duration and the short CP duration.

14. The user equipment of claim 11, wherein the first TTU comprises a starting symbol duration of the first subcarrier spacing, the starting symbol duration of the first subcarrier spacing comprising the fixed additional CP duration and a first scalable symbol duration of the first number of consecutive scalable symbol durations of the first subcarrier spacing, wherein the second TTU comprises a starting symbol duration of the base subcarrier spacing, the starting symbol duration of the base subcarrier spacing comprising the fixed additional CP duration and a second scalable symbol duration of the second number of consecutive scalable symbol durations of the base subcarrier spacing, and wherein the starting symbol duration of the first subcarrier spacing is not scaled with the starting symbol duration of the base subcarrier spacing.

15. The user equipment of claim 11, wherein the fixed additional CP duration is equal to a time length of 16 samples based on a sampling frequency of 30.72 MHz.

16. The user equipment of claim 11, wherein the fixed additional CP duration is at the start of the first TTU and at the start of the second TTU, and the start of the first TTU and the start of the second TTU are aligned in time domain, and the end of the first TTU and the end of the second TTU are aligned in the time domain.

17. The user equipment of claim 16, wherein a first frequency sub-band is associated with the first TTU and a second frequency sub-band is associated with the second TTU.

18. The user equipment of claim 11, wherein the first subcarrier spacing is 30 kHz, a time length of the first TTU is 0.5 ms, and the first TTU comprises the fixed additional CP duration and fourteen consecutive scalable symbol durations of the first subcarrier spacing.

19. The user equipment of claim 11, wherein the first subcarrier spacing is 60 kHz, a time length of the first TTU is 0.5 ms, and the first TTU comprises the fixed additional CP duration and twenty-eight consecutive scalable symbol durations of the first subcarrier spacing.

20. The user equipment of claim 11, wherein the base subcarrier spacing is 15 kHz, a time length of the second TTU is 0.5 ms, and the second TTU comprises the fixed additional CP duration and seven consecutive scalable symbol durations of the base subcarrier spacing.

21. A method comprising:
transmitting, by a network device, an indication of a first subcarrier spacing to a user equipment (UE); and
transmitting or receiving, by the network device with the UE, an orthogonal frequency division multiplexing (OFDM) signal according to the first subcarrier spacing associated with a first transmission time unit (TTU),
wherein the first TTU comprises a fixed additional cyclic prefix (CP) duration and a first number of consecutive scalable symbol durations of the first subcarrier spacing, each scalable symbol duration of the first subcarrier spacing having a same time length and each comprising a first cyclic prefix (CP) part and a first useful OFDM signal part,
wherein the first subcarrier spacing is a $2^n$ multiple of a base subcarrier spacing, where n is a non-zero integer and the base subcarrier spacing is associated with a second TTU, the second TTU having a same time length as the first TTU and the second TTU comprising the fixed additional CP duration and a second number of consecutive scalable symbol durations of the base subcarrier spacing, each scalable symbol duration of the base subcarrier spacing having a same time length and each comprising a second CP part and a second useful OFDM signal part,
wherein a time length of the second CP part is the $2^n$ multiple of a time length of the first CP part and a time length of the second useful OFDM signal part is the $2^n$ multiple of a time length of the first useful OFDM signal part.

22. The method of claim 21, wherein the base subcarrier spacing is 15 kHz and is associated with a long CP duration and a short CP duration, where a time length of the fixed additional CP duration is the difference between the long CP duration and the short CP duration.

23. The method of claim 21, wherein the first subcarrier spacing is 15 kHz and is associated with a long CP duration and a short CP duration, where a time length of the fixed additional CP duration is the difference between the long CP duration and the short CP duration.

24. The method of claim 21, wherein the first TTU comprises a starting symbol duration of the first subcarrier spacing, the starting symbol duration of the first subcarrier spacing comprising the fixed additional CP duration and a first scalable symbol duration of the first number of consecutive scalable symbol durations of the first subcarrier spacing, wherein the second TTU comprises a starting symbol duration of the base subcarrier spacing, the starting symbol duration of the base subcarrier spacing comprising the fixed additional CP duration and a second scalable symbol duration of the second number of consecutive scalable symbol durations of the base subcarrier spacing, and wherein the starting symbol duration of the first subcarrier spacing is not scaled with the starting symbol duration of the base subcarrier spacing.

25. The method of claim 21, wherein the fixed additional CP duration is equal to a time length of 16 samples based on a sampling frequency of 30.72 MHz.

26. The method of claim 21, wherein the fixed additional CP duration is at the start of the first TTU and at the start of the second TTU, and the start of the first TTU and the start of the second TTU are aligned in time domain, and the end of the first TTU and the end of the second TTU are aligned in the time domain.

27. The method of claim 26, wherein a first frequency sub-band is associated with the first TTU and a second frequency sub-band is associated with the second TTU.

28. The method of claim 21, wherein the first subcarrier spacing is 30 kHz, a time length of the first TTU is 0.5 ms, and the first TTU comprises the fixed additional CP duration and fourteen consecutive scalable symbol durations of the first subcarrier spacing.

29. The method of claim 21, wherein the first subcarrier spacing is 60 kHz, a time length of the first TTU is 0.5 ms, and the first TTU comprises the fixed additional CP duration and twenty-eight consecutive scalable symbol durations of the first subcarrier spacing.

30. The method of claim 21, wherein the base subcarrier spacing is 15 kHz, a time length of the second TTU is 0.5 ms, and the second TTU comprises the fixed additional CP duration and seven consecutive scalable symbol durations of the base subcarrier spacing.

31. A network device comprising:
a memory storing instructions; and
a processor configured, by the instructions, to:
transmit an indication of a first subcarrier spacing to a user equipment (UE); and
transmit or receive an orthogonal frequency division multiplexing (OFDM) signal according to the first subcarrier spacing associated with a first transmission time unit (TTU),
wherein the first TTU comprises a fixed additional cyclic prefix (CP) duration and a first number of consecutive scalable symbol durations of the first subcarrier spacing, each scalable symbol duration of the first subcarrier spacing having a same time length and each comprising a first cyclic prefix (CP) part and a first useful OFDM signal part,
wherein the first subcarrier spacing is a $2^n$ multiple of a base subcarrier spacing, where n is a non-zero integer and the base subcarrier spacing is associated with a second TTU, the second TTU having a same time length as the first TTU and the second TTU comprising the fixed additional CP duration and a second number of consecutive scalable symbol durations of the based subcarrier spacing, each scalable symbol duration of the base subcarrier spacing having a same time length and each comprising a second CP part and a second useful OFDM signal part,
wherein a time length of the second CP part is the $2^n$ multiple of a time length of the first CP part and a time length of the second useful OFDM signal part is the $2^n$ multiple of a time length of the first useful OFDM signal part.

32. The network device of claim 31, wherein the base subcarrier spacing is 15 kHz and is associated with a long CP duration and a short CP duration, where a time length of the fixed additional CP duration is the difference between the long CP duration and the short CP duration.

33. The network device of claim 31, wherein the first subcarrier spacing is 15 kHz and is associated with a long CP duration and a short CP duration, where a time length of the fixed additional CP duration is the difference between the long CP duration and the short CP duration.

34. The network device of claim 31, wherein the first TTU comprises a starting symbol duration of the first subcarrier spacing, the starting symbol duration of the first subcarrier spacing comprising the fixed additional CP duration and a first scalable symbol duration of the first number of consecutive scalable symbol durations of the first subcarrier spacing, wherein the second TTU comprises a starting symbol duration of the base subcarrier spacing, the starting symbol duration of the base subcarrier spacing comprising the fixed additional CP duration and a second scalable symbol duration of the second number of consecutive scalable symbol durations of the base subcarrier spacing, and wherein the starting symbol duration of the first subcarrier spacing is not scaled with the starting symbol duration of the base subcarrier spacing.

35. The network device of claim 31, wherein the fixed additional CP duration is equal to a time length of 16 samples based on a sampling frequency of 30.72 MHz.

36. The network device of claim 31, wherein the fixed additional CP duration is at the start of the first TTU and at the start of the second TTU, and the start of the first TTU and the start of the second TTU are aligned in time domain, and the end of the first TTU and the end of the second TTU are aligned in the time domain.

37. The network device of claim 36, wherein a first frequency sub-band is associated with the first TTU and a second frequency sub-band is associated with the second TTU.

38. The network device of claim 31, wherein the first subcarrier spacing is 30 kHz, a time length of the first TTU is 0.5 ms, and the first TTU comprises the fixed additional CP duration and fourteen consecutive scalable symbol durations of the first subcarrier spacing.

39. The network device of claim 31, wherein the first subcarrier spacing is 60 kHz, a time length of the first TTU is 0.5 ms, and the first TTU comprises the fixed additional CP duration and twenty-eight consecutive scalable symbol durations of the first subcarrier spacing.

40. The network device of claim 31, wherein the base subcarrier spacing is 15 kHz, a time length of the second TTU is 0.5 ms, and the second TTU comprises the fixed additional CP duration and seven consecutive scalable symbol durations of the base subcarrier spacing.

* * * * *